July 16, 1957  C. SCHRAMM  2,799,029
BOOK JACKETING MACHINE
Original Filed Oct. 30, 1948  17 Sheets-Sheet 1

INVENTOR
CARL SCHRAMM
BY S. Jay Teller
ATTORNEY

INVENTOR
CARL SCHRAMM
BY S. Jay Teller
ATTORNEY

July 16, 1957  C. SCHRAMM  2,799,029
BOOK JACKETING MACHINE
Original Filed Oct. 30, 1948  17 Sheets-Sheet 3

INVENTOR
CARL SCHRAMM
BY S. Jay Teller
ATTORNEY

INVENTOR
CARL SCHRAMM
BY S. Jay Teller
ATTORNEY

July 16, 1957
C. SCHRAMM
2,799,029
BOOK JACKETING MACHINE
Original Filed Oct. 30, 1948
17 Sheets-Sheet 5
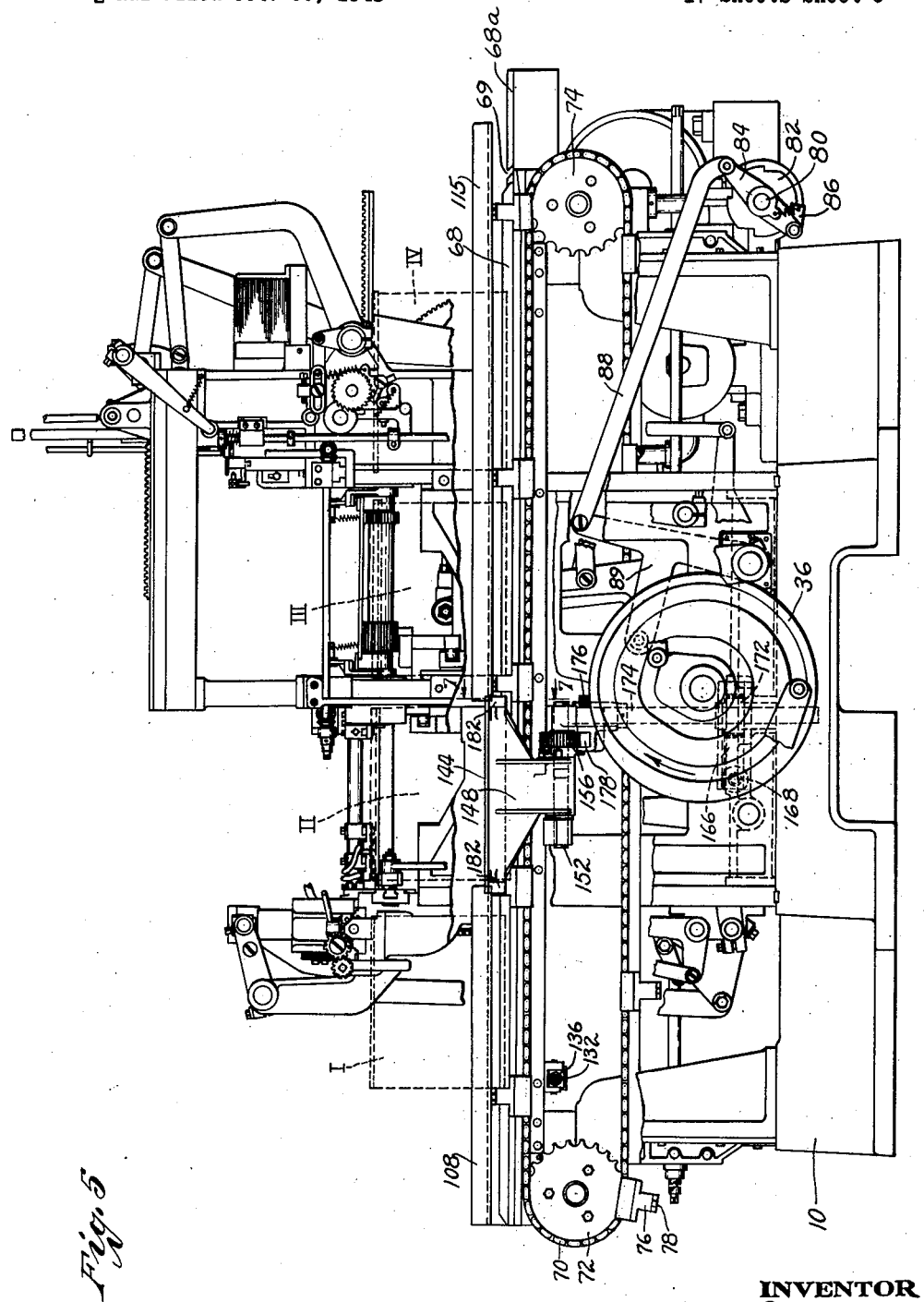
INVENTOR
CARL SCHRAMM
BY S. Jay Teller
ATTORNEY July 16, 1957
C. SCHRAMM
2,799,029
BOOK JACKETING MACHINE
Original Filed Oct. 30, 1948
17 Sheets-Sheet 6
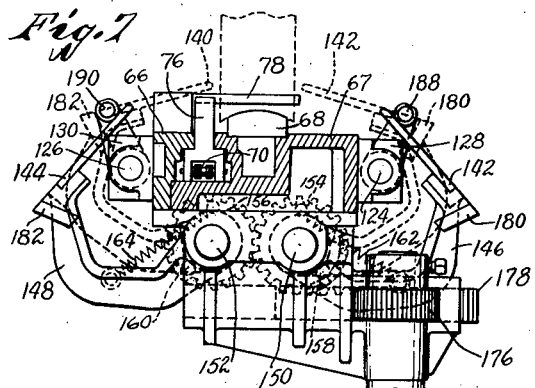
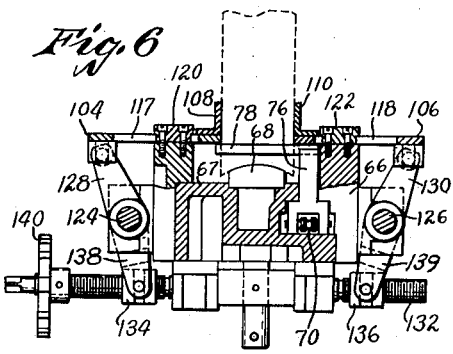
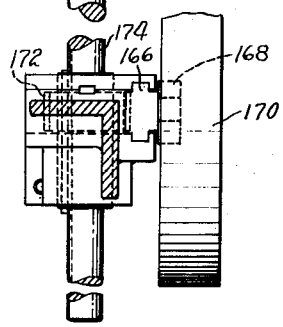
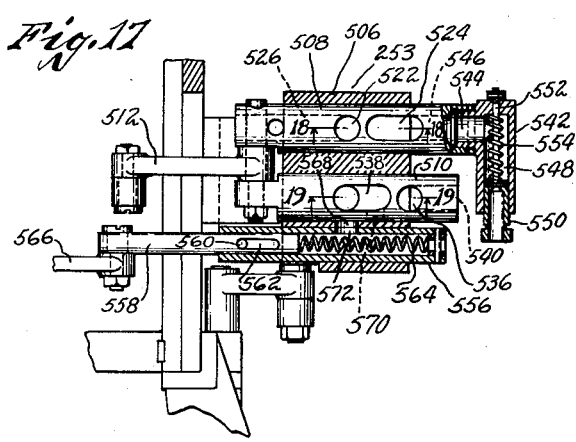
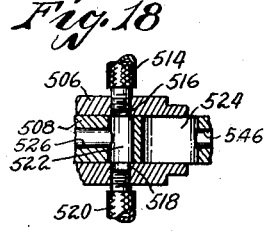
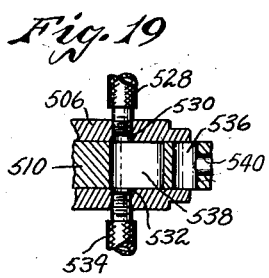
INVENTOR
CARL SCHRAMM
BY J. Jay Teller
ATTORNEY

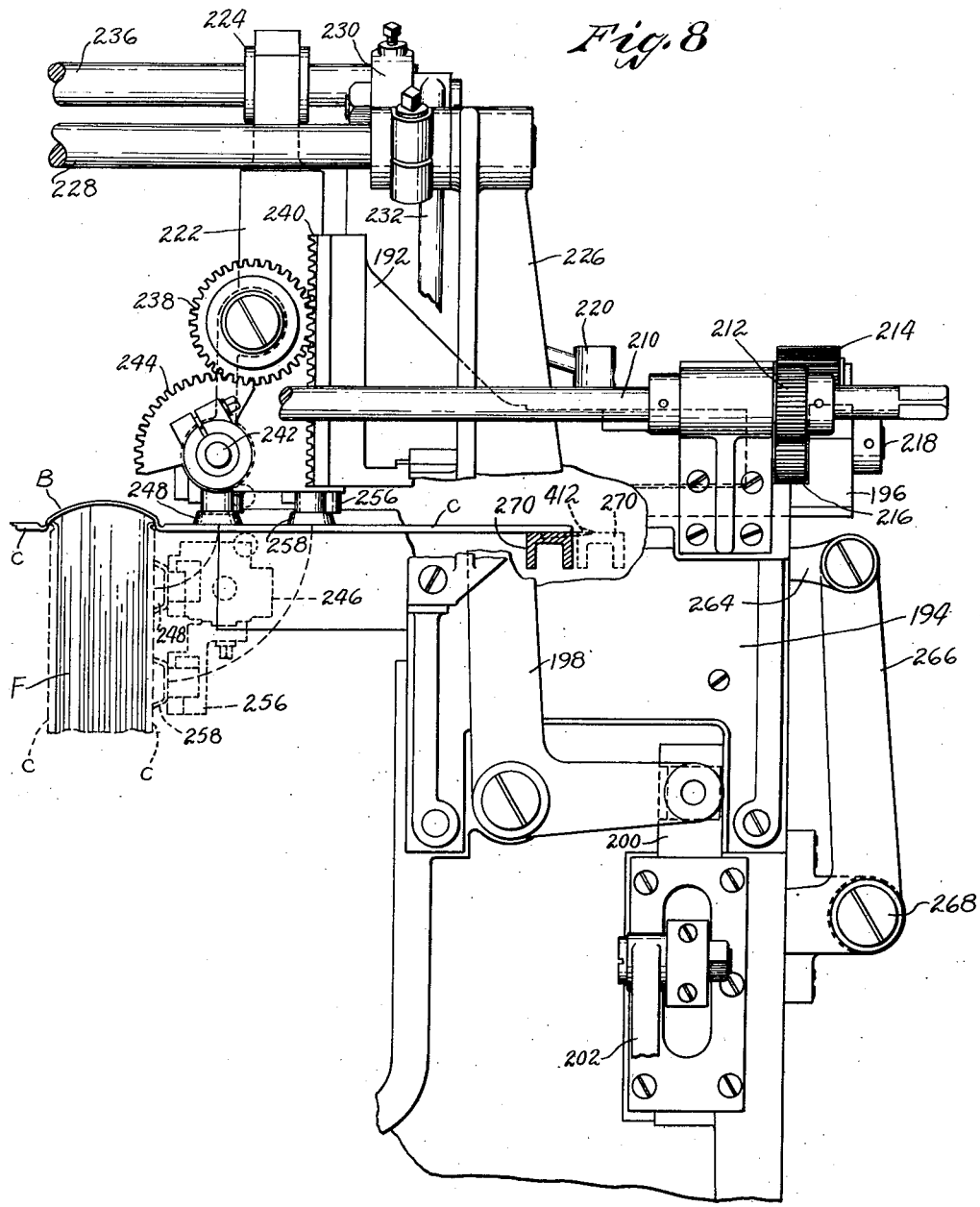

July 16, 1957 C. SCHRAMM 2,799,029
BOOK JACKETING MACHINE
Original Filed Oct. 30, 1948 17 Sheets-Sheet 8

INVENTOR
CARL SCHRAMM
BY S. Jay Teller
ATTORNEY

July 16, 1957  C. SCHRAMM  2,799,029
BOOK JACKETING MACHINE
Original Filed Oct. 30, 1948  17 Sheets-Sheet 9
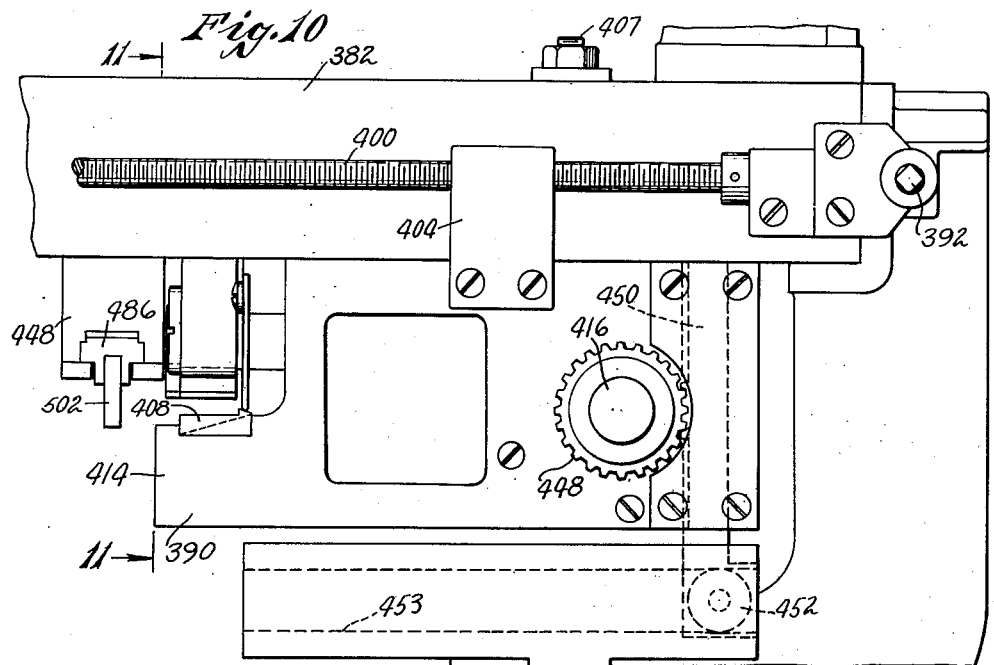
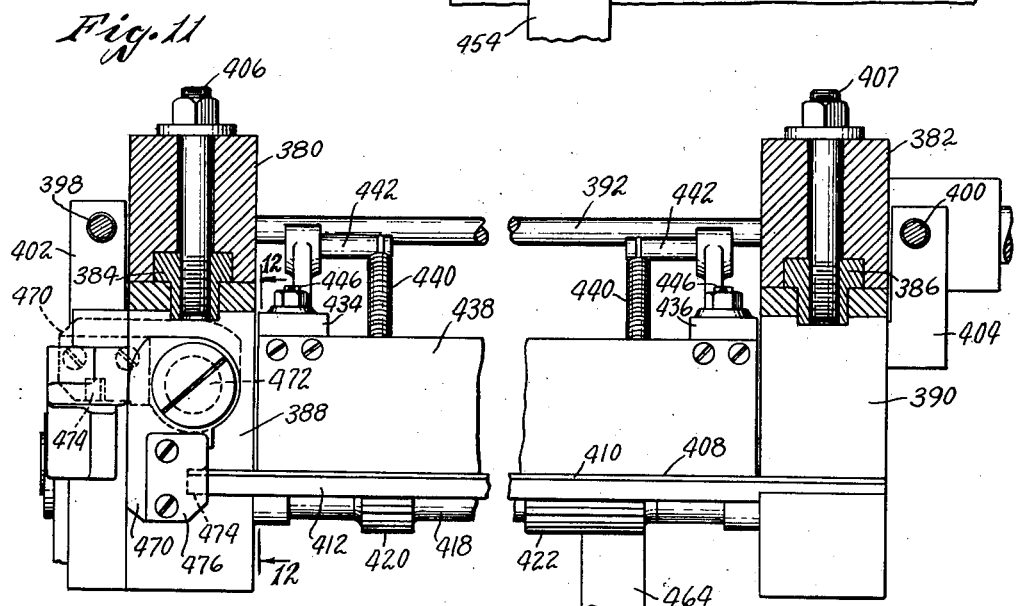
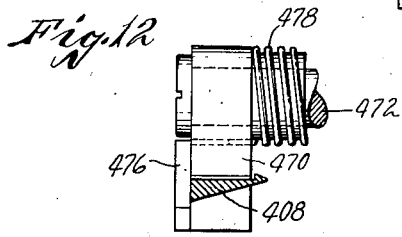
INVENTOR
CARL SCHRAMM
BY S. Jay Teller
ATTORNEY July 16, 1957 C. SCHRAMM 2,799,029
BOOK JACKETING MACHINE
Original Filed Oct. 30, 1948 17 Sheets-Sheet 10

INVENTOR
CARL SCHRAMM
BY S. Jay Teller
ATTORNEY

July 16, 1957 C. SCHRAMM 2,799,029
BOOK JACKETING MACHINE
Original Filed Oct. 30, 1948 17 Sheets-Sheet 11

INVENTOR
CARL SCHRAMM
BY S. Jay Teller
ATTORNEY

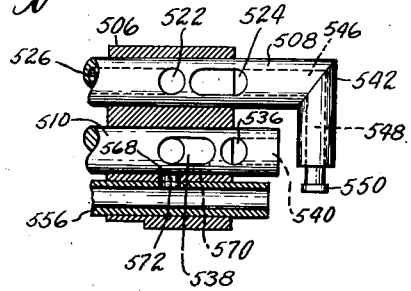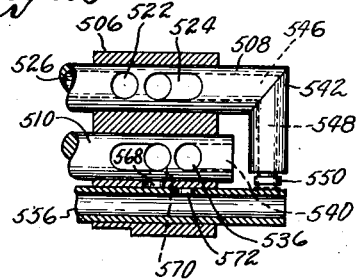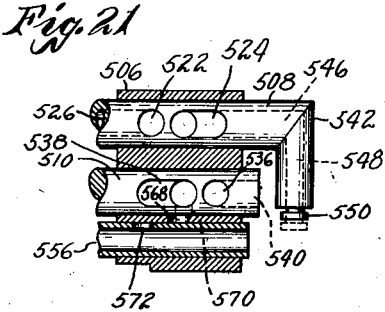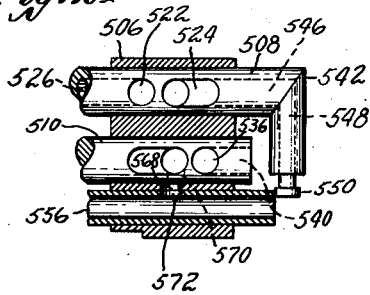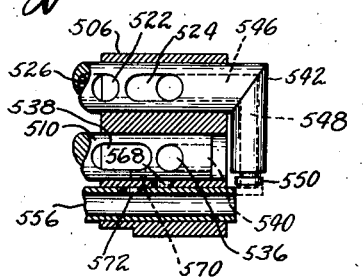

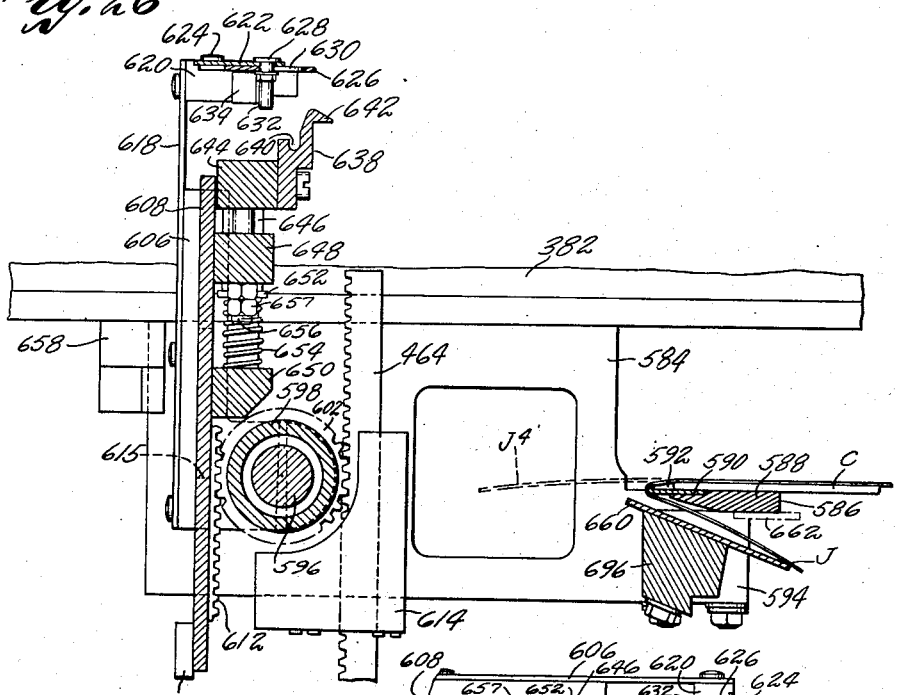
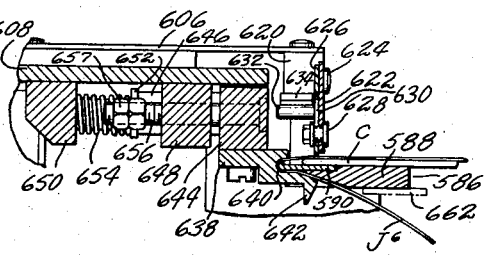
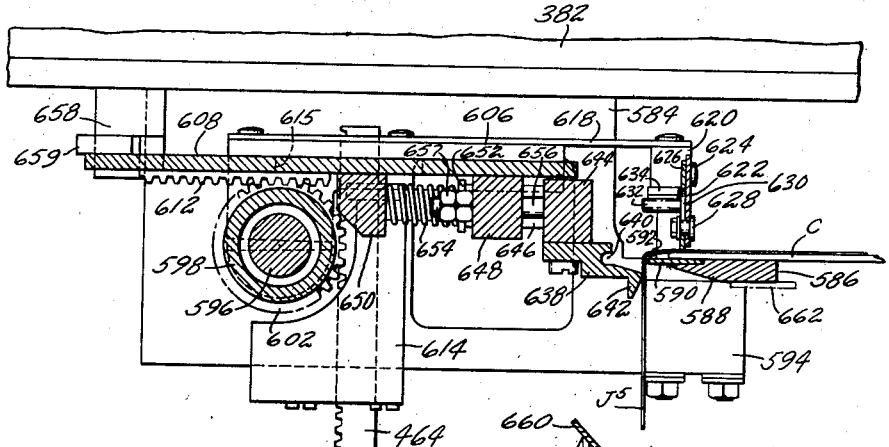

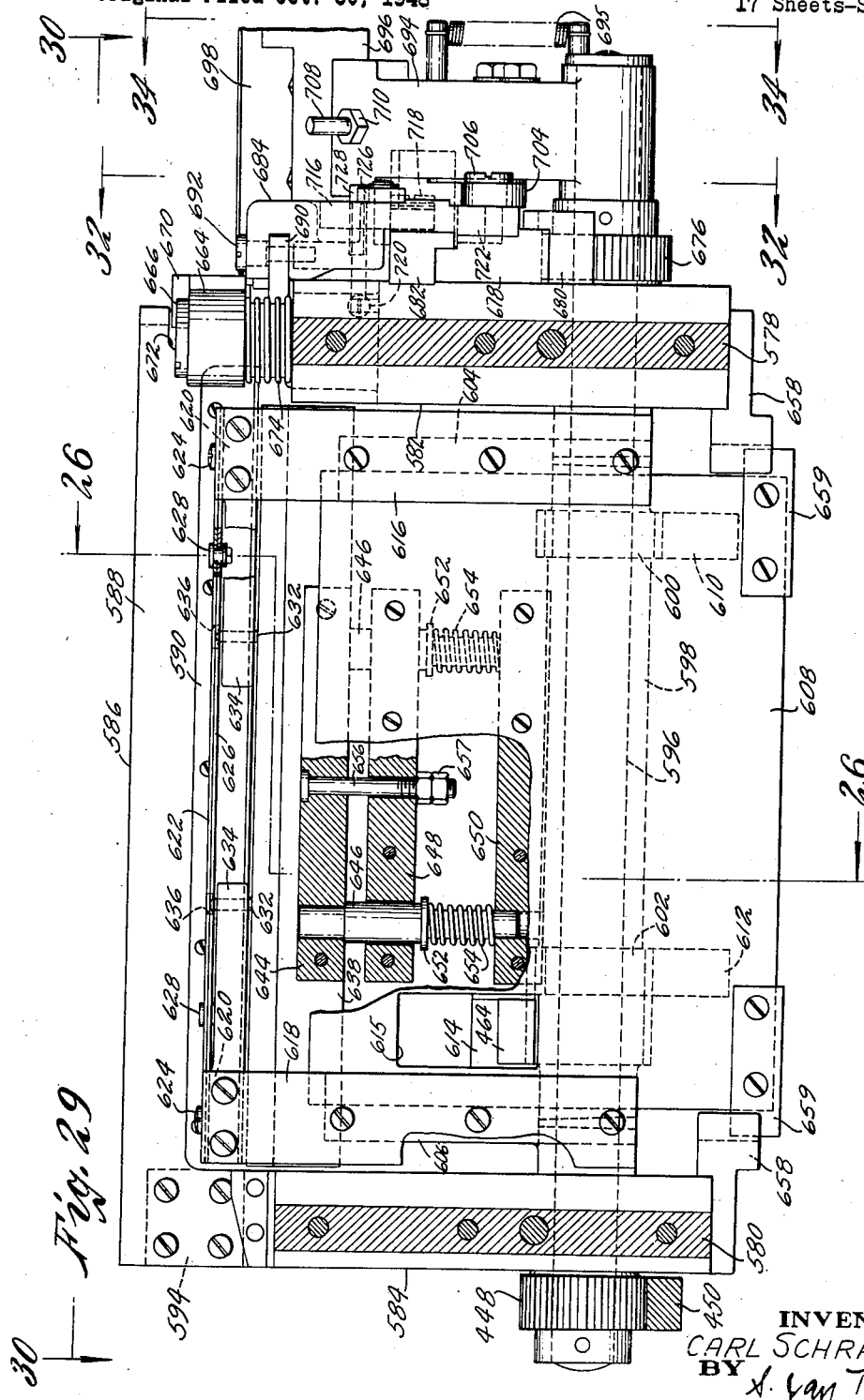

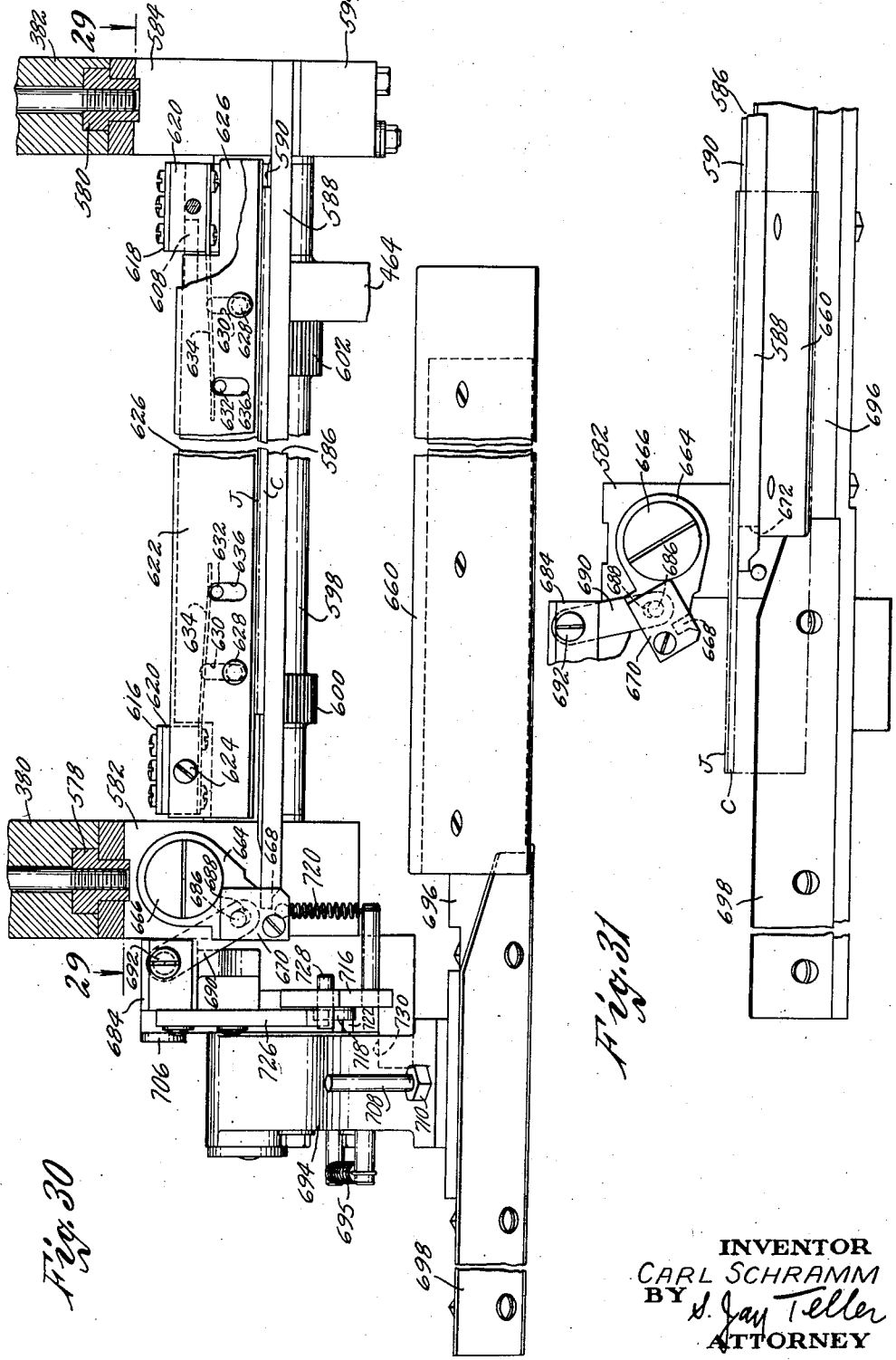

July 16, 1957 C. SCHRAMM 2,799,029
BOOK JACKETING MACHINE
Original Filed Oct. 30, 1948 17 Sheets-Sheet 16

INVENTOR
CARL SCHRAMM
BY S. Jay Teller
ATTORNEY

July 16, 1957   C. SCHRAMM   2,799,029
BOOK JACKETING MACHINE
Original Filed Oct. 30, 1948   17 Sheets-Sheet 17

INVENTOR
CARL SCHRAMM
BY S. Jay Teller
ATTORNEY

United States Patent Office 2,799,029
Patented July 16, 1957

2,799,029

BOOK JACKETING MACHINE

Carl Schramm, North Coventry, Conn., assignor to The Smyth Manufacturing Company, Hartford, Conn., a corporation of Connecticut Continuation of abandoned application Serial No. 57,550, October 30, 1948. This application April 13, 1953, Serial No. 348,151

79 Claims. (Cl. 11—1)

This application is a continuation of my copending application for Book Jacketing Machine, Serial No. 57,550, filed October 30, 1948, now abandoned, which application was a continuation-in-part of my now abandoned application for Book Jacketing Machine, Serial No. 700,003, filed September 28, 1946.

The invention relates to a machine for applying jackets, usually paper jackets, to previously bound books. It has been the usual prior practice to apply such jackets manually, and this has been troublesome and costly. The general object of the present invention is to provide a machine which eliminates the manual labor of jacketing the books and which applies the jackets entirely automatically. In accordance with the invention there is provided a machine which is adapted to receive books in vertical positions with the backs upward and which will in sequence preferably open the covers of each book, transfer a suitable jacket from a stack and place it on the opened covers of the book, fold the jacket so that the end portions thereof will be below and adjacent the covers, and finally close the covers of the book with the jacket in place.

One of the more specific objects of the invention is to provide a suitable mechanism for feeding books through the machine, preferably intermittently, and for supporting the books while being so moved, the said book moving and supporting mechanism preferably being readily adjustable for books of different sizes.

Another specific object of the invention is to provide a suitable mechanism operable in timed relationship with other parts for opening the covers of the books and for supporting the said covers in open positions.

Another specific object of the invention is to provide a suitable mechanism operable in timed relationship with other parts for transferring jackets from a stack and for placing them on the open covers of the books.

Still another specific object of the invention is to provide a suitable mechanism operable in timed relationship with other parts for folding the jackets to bring the edge portions thereof below and adjacent the inner faces of the open covers of the books.

Still another specific object of the invention is to provide a suitable means associated with or forming a part of the folding mechanism for providing a proper amount of slack in the folded jackets in order to permit the books to be readily closed with the folded jackets in place.

A still further specific object of the invention is to provide suitable means for moving the respective jackets simultaneously and in unison with the corresponding books as the books are moved from the jacket receiving station, this means assuring proper location of the jackets on the books when the covers are closed.

A still further specific object of the invention is to provide means automatically operable upon failure of the book opening means to open a book for preventing the placement of a jacket by the jacket placing means.

A still further specific object of the invention is to provide means automatically operable in timed relationship with the folding means for momentarily holding the jackets in folded positions and for then permitting the book covers to move to closed positions with the folded jackets in place.

Various other specific objects of the invention will be apparent from the accompanying drawings and from the following specification and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 5 is a view similar to Fig. 2, but with certain parts broken away to show other parts.

Fig. 6 is an enlarged fragmentary transverse sectional view taken along the line 6—6 of Fig. 4.

Fig. 7 is an enlarged fragmentary transverse sectional view taken along the line 7—7 of Fig. 5.

Fig. 8 is an enlarged fragmentary front view of a part of the book opening mechanism.

Fig. 10 is an enlarged fragmentary front view taken along the line 10—10 of Fig. 4.

Fig. 11 is an enlarged fragmentary vertical sectional view taken along the line 11—11 of Fig. 4 and along the line 11—11 of Fig. 10.

Fig. 12 is a fragmentary vertical view taken along the line 12—12 of Fig. 11.

Fig. 17 is an enlarged horizontal sectional view of the valve mechanism taken along the line 17—17 of Fig. 3.

Fig. 18 is a fragmentary vertical sectional view taken along the line 18—18 of Fig. 17.

Fig. 19 is a fragmentary vertical sectional view taken along the line 19—19 of Fig. 17.

Figs. 20 to 24 are diagrammatic views showing various positions of the valve mechanism.

Fig. 26 is a view similar to Fig. 13 but taken in the opposite direction along the line 26—26 of Fig. 29, this view showing an alternative jacket holding and folding mechanism with certain parts thereof in their upper inoperative positions.

Fig. 27 is a view similar to Fig. 26, but showing the parts in their lower jacket holding and folding positions.

Fig. 28 is a fragmentary view similar to Fig. 27 but showing certain parts additionally moved for a complete folding of the jacket.

Fig. 29 is a horizontal sectional and plan view taken along the line 29—29 of Fig. 30.

Fig. 30 is an elevational view taken in the direction of the arrows 30—30 in Fig. 29.

Fig. 31 is a fragmentary view similar to Fig. 30 but showing various parts in different positions.

*General organization*

Figure 1:
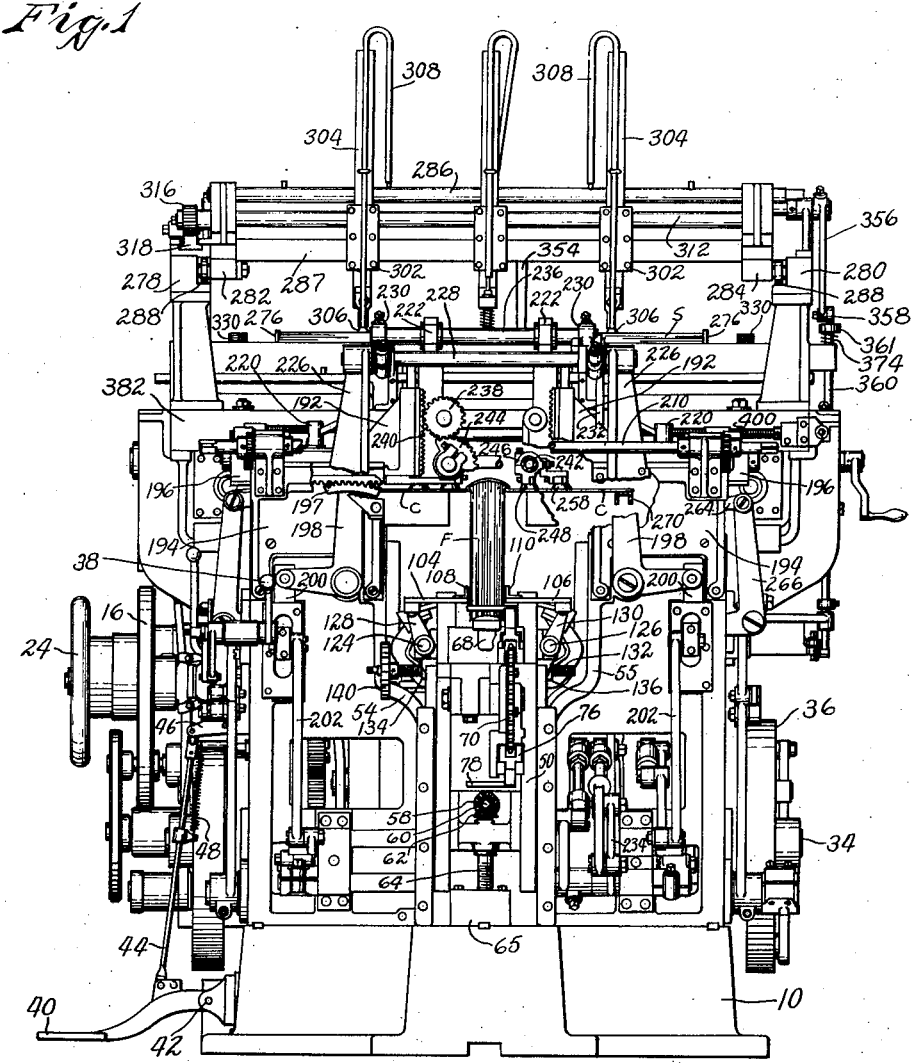
Fig. 1 is a front view of a machine embodying the invention, an opened book being shown at the book opening station.

Referring to the drawings, 10 is the main base on which all of the other parts of the machine are supported. Power for operating the machine is supplied by means of an electric motor 12 supported on a bracket 14 carried by the base 10. Power is transmitted from the motor 12 by means of a belt 16 extending over a pulley 18 on the motor shaft and over a pulley 20 on a transverse drive shaft near the middle of the machine. The drive shaft carries a hand wheel 24 by means of which the machine can be operated manually for purposes of set-up and adjustment. The drive shaft carries a pinion 26 from which power is transmitted by gears 28 and 30 to a gear 32 on a main transverse cam shaft 34. The cam shaft carries various cams which operate most of the mechanisms of the machine. One of the said cams is shown at 36 but some of the other cams are not shown in detail. The cams serve to give predetermined properly timed motions to various parts of the machine in accordance with well known mechanical principles and do not in and of themselves constitute part of the invention.

For starting and stopping the operation of the machine there is provided a conveniently located hand lever 38 controlling a suitable clutch. For starting the operation of the machine, but not for stopping it, there is provided a foot treadle 40. This treadle is pivoted to the main frame 10 at 42 and is connected by means of a link 44 with a lever 46. A spring 48 serves to bias the link 44 and the treadle 40 in the upward direction. The mechanism for starting and stopping may be of conventional design and is not shown in detail as it does not constitute a part of the invention.

*Mechanism for supporting and moving books*

The books to which the jackets are to be applied are moved horizontally through the machine. The books to be jacketed may be supplied to the front of the machine manually, or by a suitable feeding mechanism which is not shown. The completely jacketed books may be removed from the rear of the machine manually or by a suitable mechanism which is not shown.

While the invention is not necessarily so limited, the books are preferably moved intermittently, and are brought to rest in successive stations. The number of stations may be varied, but preferably and as shown, there are four stations designated respectively as I, II, III and IV in Fig. 5. Station I is an idle station designated for convenience as the book loading station, station II is the book opening station, station III is the jacket applying station, and station IV is designated for convenience as the book closing station. The drawings show means for moving the books intermittently as is preferred, and this means will be described in detail.

The means for supporting and moving the books is preferably adjustable vertically to provide for books of different widths. This vertical adjustment could be eliminated in a machine intended for use with books of only one width, but the vertical adjustment is highly desirable and is shown and will be described. The mechanism for supporting the books and for moving them through the machine is carried on two slides 50 and 52 which are vertically movable in guideways formed in pairs of brackets 54, 55 and 56, 57 carried by the base 10 near the ends thereof. Extending longitudinally of the machine and through both slides is a horizontal shaft 58 squared or otherwise formed at its ends so that it can be engaged by a wrench or crank and readily turned. Associated with each of the slides 50 and 52 and mounted on the shaft 58 is a bevel gear 60 meshing with another bevel gear 62 on a vertical rotatable screw 64. The screw 64 extends at its lower end into a threaded member 65 on the base. By rotating the shaft 58 the screws 64 can be rotated, thus raising or lowering both of the slides 50 and 52 simultaneously.

Carried by the upper parts of the slides 50 and 52 are longitudinal members 66 and 67, shown more clearly in Fig. 6, and the member 67 carries a supporting device or rail 68 which serves to support and guide the books. The rail 68 is preferably replaceable and should have a width the same as or slightly less than the thickness of the books to be handled by the machine. For thicker or thinner books rails of different widths may be substituted. By means of the shaft 58 and the adjusting mechanism that has been described, the slides 50 and 52 are adjusted vertically so as to bring the rail 68 to such an elevation that the backs of the books are at a predetermined fixed elevation. The rail is adjusted upward or downward in accordance with the width of the books.

A suitable means is provided for moving the books longitudinally along the rail 68 and through the machine, and this means is preferably an endless chain 70 passing over sprocket wheels 72 and 74 carried respectively by the slides 50 and 52. The chain carries a series of uniformly spaced lugs 76, 76, each of the lugs having a transverse pusher 78. The pushers 78 are adapted to extend over the rail 68 and to engage the retrograde ends of the books to move them along the rail. The longitudinal members 66 and 67 are formed to provide a guideway for the upper run of the chain and for the lugs 76, 76. At the discharge end of the machine there is provided a separate rail section 68ª registering with the main rail 68 and spaced therefrom to provide a slot 69. This slot permits the pushers 78 to move downwardly as the chain passes around the sprocket wheel 74.

The chain 70 is moved intermittently, the amount of each movement being equal to the spacing between each two adjacent lugs 76, 76, which spacing is the same as the spacing between each two adjacent stations, I, II, III and IV. For moving the chain there is provided a shaft 80 carrying a ratchet wheel 82. Pivotally mounted on the shaft 80 is a rocker arm 84 carrying a spring-pressed ratchet 86 adapted to engage the teeth of the ratchet wheel 82. The rocker arm 84 is oscillated by means of a link 88 which is connected with a pivoted arm 89 shown in Fig. 5. The arm 89 is oscillated by means of a cam on the shaft 34. The shaft 80 carries a bevel gear 90 which meshes with a bevel gear 92 carried by a bracket 94. A vertical shaft 96 has splined engagement with the gear 92 and this shaft is supported at its upper end by a bearing bracket 98 carried by the vertically movable slide 52. The shaft 96 carries a bevel gear 100 meshing with a bevel gear 102 on the shaft which carries the sprocket wheel 74. The ratios of the gears 90 and 92 and of the gears 100 and 102 are such that the chain 70 is moved through a distance equal to the spacings between the lugs 76, 76 upon each movement of the ratchet wheel 82.

Figure 4:
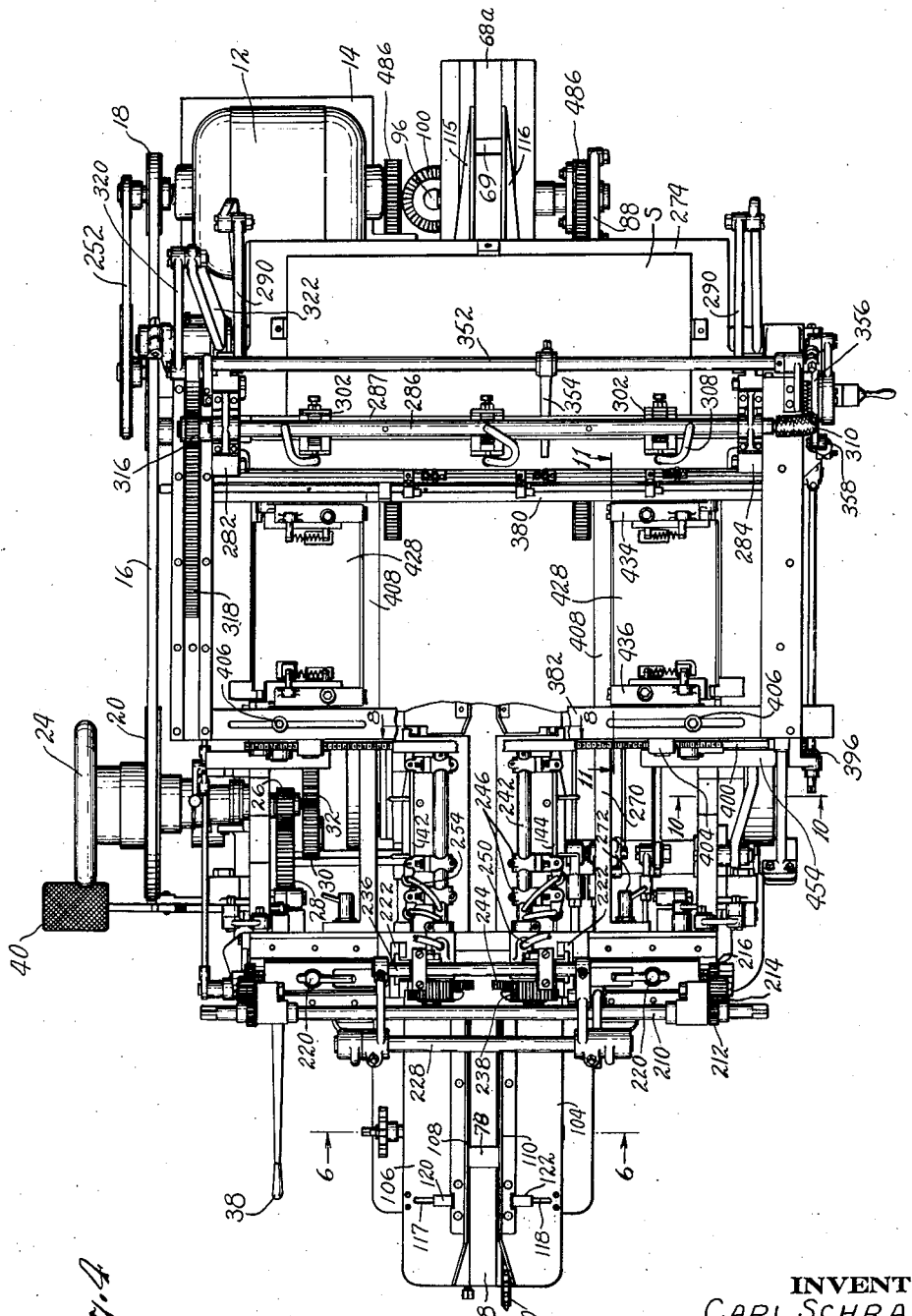
Fig. 4 is a plan view.

For holding the books upright on the rail 68 at the front portion thereof two horizontal plates 104 and 106 are provided, these being supported at a level above that of the said rail. The plates 104 and 106 are supported on upward extending portions of the members 66 and 67. To assist in supporting the books the plates 104 and 106 are provided with angle bars 108 and 110. At the rear end of the machine there are plates 112 and 114 similar to the plates 104 and 106 and similarly supported. These plates are provided with angle bars 115 and 116, the rear portions of which project beyond the plates and are tapered as shown in Fig. 4. The spacing between the plates 112 and 114 is preferably slightly less than that between the plates 104 and 106, for the reason that the said plates 112 and 114 support the books with the covers open and therefore engage the book fillers only and not the complete books.

Figure 3:
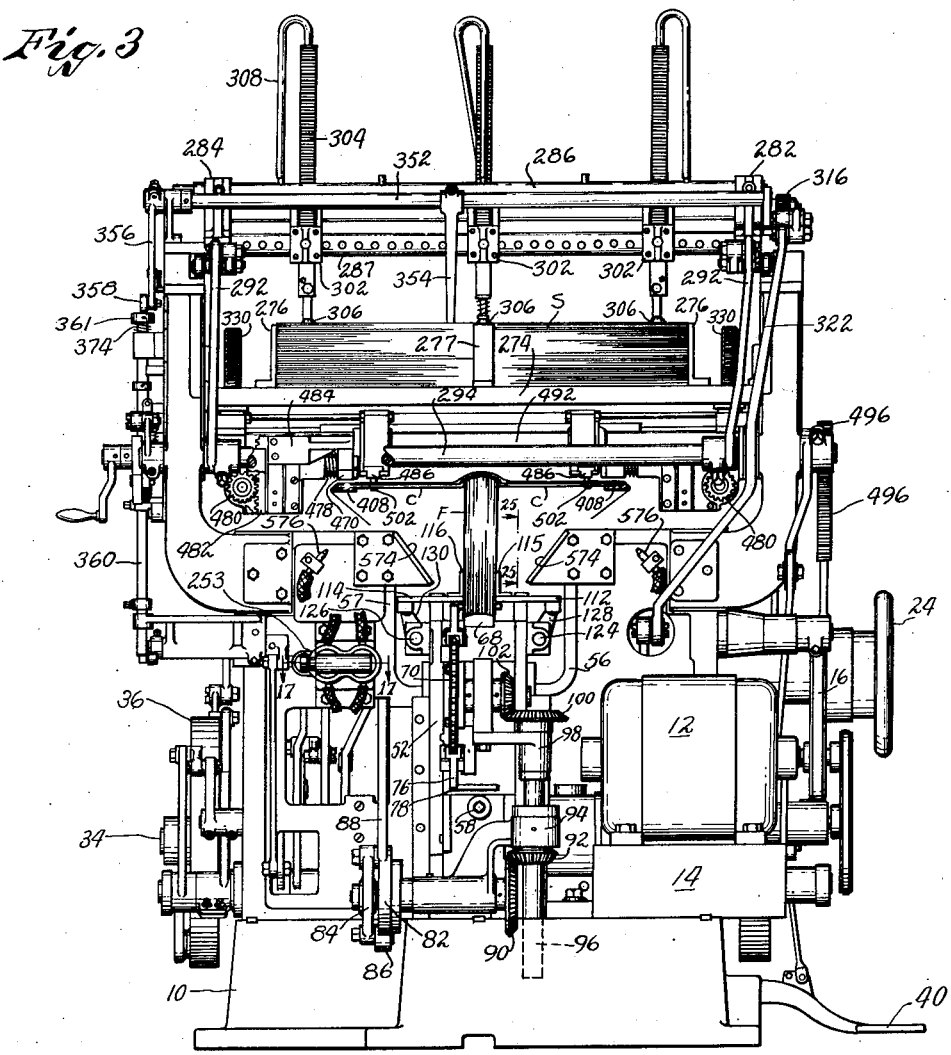
Fig. 3 is a rear view, an opened book with a folded jacket thereon being shown at the jacket applying station.

The plates 104 and 106 and the plates 112 and 114 are preferably horizontally adjustable toward and from each other in order to accommodate books of different thicknesses. The plates are provided with a plurality of sets of transverse guide slots 117 and 118 through which project guide members 120 and 122, one set of slots and guide members being shown in Fig. 4 and in Fig. 6. For adjusting the plates 104 and 106 and the plates 112 and 114 there are provided two rockshafts 124 and 126 which extend longitudinally of the machine and are supported in suitable bearing brackets carried by the longitudinal members 66 and 67. The rockshafts 124 and 126 respectively carry pluralities of pairs of arms 128 and 130, the upper ends of which are entered in notches formed in blocks depending from the outer edge portions of the plates 104 and 106 and of the plates 112 and 114. One pair of arms 128 and 130 is shown in Figs. 1 and 6 and another pair is shown in Fig. 3. For rocking the shafts 124 and 126 there is provided a transverse shaft 132, shown in Fig. 6, mounted in bearings on the slide 52, and having oppositely threaded portions which engage nonrotatable nuts 134 and 136. Secured to the rockshafts 124 and 126, preferably as extensions of the arms 128 and 130, are arms 138 and 139 which engage the nuts 134 and 136. The shaft 132 carries a hand wheel 140 by which it may be turned. When the shaft 132 is turned by means of the hand wheel 140, the nuts 134 and 136 are moved in opposite directions thus oppositely rocking the shafts 124 and 126 so as to move the plates 104 and 106 and the plates 112 and 114 inward or outward simultaneously and to uniform extents.

The books are supported at the front end of the machine, including the book loading station I, by means of the plates 104 and 106 with their angle bars 108 and 110. The books are supported at the jacket applying station III and at the book closing station IV by means of the plates 112 and 114 with their angle bars 115 and 116. When an automatic book opening means is provided, as is preferred, the last above mentioned plates and angle bars terminate at the book opening station II as shown in Fig. 5, and separate means are provided for supporting the books at that station, such means being shown in detail in Figs. 5 and 7. The book supporting elements at station II are transversely movable and are automatically moved out of their book supporting positions in timed relation with the book opening mechanism to be presently described. This permits the opening of the book by the opening mechanism, and after such opening the supporting elements are returned to their book supporting positions. These supporting elements and parts of the operating means therefor are carried by the longitudinal member 67 and are therefore vertically movable with the other book moving and supporting parts, when such parts are vertically adjusted in accordance with the width of the books to be handled.

At the book opening station there are two oppositely disposed book supporting plates 142 and 144 which are so positioned and of such lengths as to be adapted to support the books between the plates 104 and 106 and the plates 112 and 114. The plates 142 and 144 are carried respectively by arms 146 and 148 which are connected respectively with short longitudinal shafts 150 and 152 carried by the longitudinal member 67. The said shafts are provided respectively with gears 154 and 156 which mesh with each other so that the shafts 150 and 152 are turned in opposite directions. The arms 146 and 148 have lost motion pivotal connections with the shafts 150 and 152, and as indicated, they are pivotally connected at 158 and 160 with the hubs of the gears 154 and 156. Springs 162 and 164 connected with the arms and with the gears tend to relatively move the arms upwardly about their pivotal connections at 158 and 160.

For operating the shafts 150 and 152 there is provided a rack 166 suitably guided for horizontal longitudinal movement. The rack 166 carries a roller 168 which is entered in a suitable cam groove in the face of a rotatable cam member 170 carried by the main cam shaft 34. The rack 166 meshes with a gear 172 having a splined connection with a vertical shaft 174. The shaft 174 carries near its upper end a gear 176 which meshes with a rack 178 guided for transverse horizontal movement. The rack 178 has teeth not only at the side thereof which mesh with the gear 176, but also teeth on the top thereof which mesh with the gear 154 on the shaft 150. From the foregoing description it will be understood that upon reciprocation of the rack 166 by reason of the engagement of its roller 168 with the groove in the cam member 170, the shaft 174 is turned, this shaft serving by means of the gear 176 and the rack 178 to turn the gears 154 and 156. Thus the arms 146 and 148 are moved in opposite directions and the plates 142 and 144 are similarly moved.

By means of the mechanism described the plates 142 and 144 are moved alternately and in properly timed relationship with the other parts of the machine between the positions shown in dotted lines in Fig. 7 and the positions shown in full lines therein. When the plates 142 and 144 are in the dotted line positions their inner edges are substantially in alignment with the inner edges of the plates 104 and 106 and the inner edges of the plates 112 and 114, and they thus serve to support the books as they move into the book opening station and as they move out of the book loading station.

As already described, the plates 104 and 106 and the plates 112 and 114 are adjustable transversely to accommodate books of different thicknesses and provision is made for correspondingly adjusting the dotted line positions of the plates 142 and 144. For this purpose the arms 146 and 148 are provided at the front and rear with longitudinally extending lugs 180 and 182. It has already been stated that the shafts 124, 126 carry several arms 128, 128 and 130, 130 for adjusting the plates 104, 106 and 112, 114. Two of the arms 128 and 130 are positioned adjacent the front edges of the plates 142 and 144 as shown in Fig. 7, and two similar arms, not shown, are positioned adjacent the rear edges of the said plates. The arms at the front carry rearward projecting pins 188 and 190 and the arms at the rear carry similar forward projecting pins. Inasmuch as the pins 188 and 190 are carried by the arms which adjust the guide plates, it will be seen that they always occupy positions corresponding to the positions of adjustment of the said plates. As the arms 146 and 148 move toward their dotted line positions, the lugs 180 and 182 engage the pins 188 and 190, the upward and inward movement of the plates 142 and 144 being thus limited. Such limitation of the movement of the arms and of the plates is permitted by means of the lost motion connections at 158 and 160 and by the springs 162 and 164. Thus the operative or dotted line positions of the plates are automatically adjusted in accordance with the adjustments of the guide plates 104 and 106 and the guide plates 112 and 114.

The timing of the mechanism is such that the plates 142 and 144 are held in their dotted line positions as each book moves from the book loading station I into the book opening station II. As soon as the book reaches the book opening station, the plates 142 and 144 are moved to their full line positions and this permits the covers of the books to be swung transversely and upwardly for opening, such opening being effected by mechanism to be presently described. As soon as the covers of the books have been opened the plates 142 and 144 are returned to their dotted line positions so as to again support the book by engagement with the filler thereof.

*Mechanism for opening books*

A book opening means is preferably provided adjacent a portion of the path of movement of the books through the machine. It is contemplated, however, that in a somewhat simpler machine the books might be opened manually and fed to the machine with the covers in open positions. Such a machine would be within the scope of the broader aspects of the invention. When the books are moved intermittently and when a book opening station is provided, the book opening means is located at the book opening station II.

As each book is moved to the book opening station II by means of the intermittently acting book moving mechanism, the covers thereof are preferably engaged by suitable mechanisms so as to be swung outwardly and upwardly to open positions and they are held in such open positions by means of suitable supports. The covers are preferably horizontal when in their open positions, but the invention is not necessarily so limited. Preferably, the cover opening mechanisms are transversely adjustable in accordance with the thickness of the books. It will be understood that no adjustment thereof is necessary for the width of the book as adjustments to take care of variations in width are effected by raising or lowering the book supporting and moving mechanisms in the manner already described. As has been pointed out, the books are so supported that the backs thereof are always at the same elevation regardless of the width.

Two similar opening mechanisms are provided for the respective covers of the books and these mechanisms are similar except for reversal. For the most part the description will be limited to the opening mechanism at the right. The major portion of the opening mechanism is carried by a slide 192 (Figs. 1, 2 and 8) transversely and horizontally guided in a bracket 194. Associated with each slide 192 is an actuating slide 196 also supported and guided in the bracket 194. The slides 192 and 196 are positioned adjacent one edge of the book opening station and preferably adjacent the retrograde edge thereof.

Figure 2:
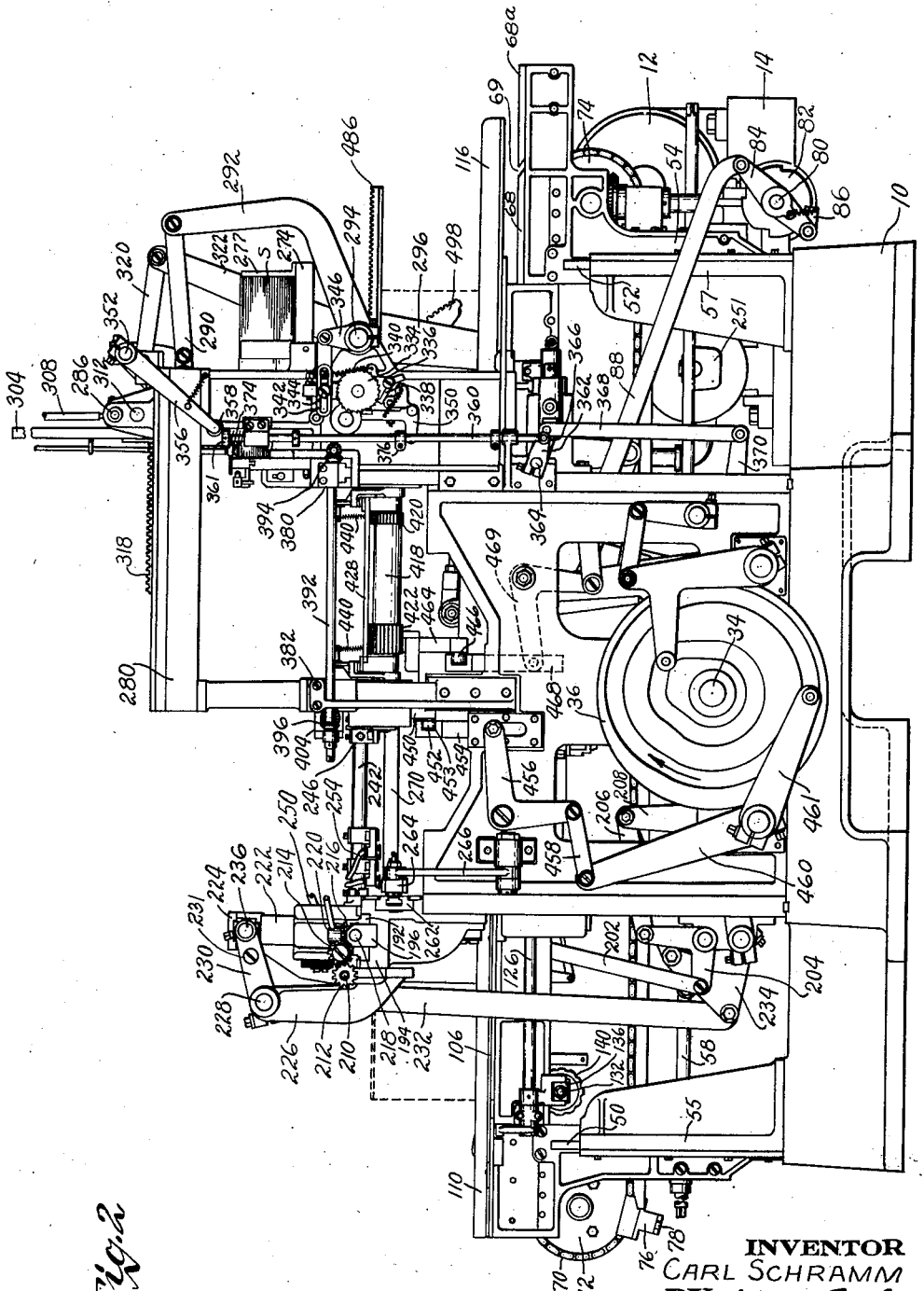
Fig. 2 is a side view.

The slides 196 are provided at their bottoms with rack teeth (Fig. 1) which mesh with gear segments 197 at the upper ends of bell crank levers 198, 198. The bell crank levers 198, 198 have transverse arms in engagement with vertically movable shoes 200, 200 which are movable in suitable guideways by means of links 202, 202. As shown in Fig. 2, each link 202 is actuated by a bell crank 204, a link 206 and an arm 208, the latter being oscillated by a suitable cam on the main cam shaft 34. During operation of the machine the described mechanism serves to reciprocate the slides 196, 196 for a purpose to be presently explained.

Each slide 192 is normally movable in unison with the corresponding actuating slide 196, but it is also adjustable relatively thereto in accordance with the thickness of the book. For effecting adjustments of the slides 192 with respect to the slides 196 there is provided a transverse shaft 210 carried by the brackets 194, 194, this shaft being formed at one or both ends for engagement with a crank. The shaft 210 is provided near its ends with pinions 212, 212 which mesh with idler gears 214, 214. The idler gears 214, 214 mesh with pinions 216 on rotatable screws 218. The outer end of each screw 218 is rotatably mounted in an upstanding lug at the outer end of the corresponding slide 196 and the inner threaded portion of the screw engages a nut, not shown, carried by the corresponding slide 192. It will be seen that when the shaft 210 is rotated by means of a crank, it serves to rotate the screws 218 so as to adjust the slides 192 inward or outward relatively to the slides 196. The slides 192, 192 are normally rigidly connected with the slides 196, 196 by means of clamping screws 220, 220. These are released prior to adjustment and are again tightened when adjustment has been completed. The pinions 216, 216 move transversely with the slides 196 when the latter are reciprocated by the mechanism that has been described. The extent of motion is relatively small and the idler gears 214, 214 are of sufficient width to remain in mesh with the pinions 216, 216 during such movement.

Each slide 192 is provided at its inner end with a vertical guideway in which is movable a vertical slide 222 having a portion which extends inwardly toward the center of the machine. The upper end of the inwardly extending portion of the slide 222 is formed with a horizontal slot for receiving a shoe 224. Carried by each bracket 194 is a second bracket 226. Mounted in bearings in the brackets 226, 226 is a transverse horizontal shaft 228 to which are rigidly connected two arms 230, 230 extending generally forward. Connected with one of the arms 230 at an intermediate position 231 is a link 232, the lower end of which is pivotally connected with a bell crank 234. By means of mechanism not fully shown the bell crank 234 is operated by a cam on the main cam shaft 34 so as to reciprocate the link 232 upwardly and downwardly and thus oscillate the levers 230, 230 and the shaft 228. Carried by the forward ends of the levers 230, 230 is a transverse rod 236 which extends through bearing apertures in the before-mentioned shoes 224. It will be seen that when the arms 230, 230 are oscillated, the rod 236 also is similarly oscillated and this rod by reason of its engagement with the shoes 224 serves to move the slide 222 vertically.

Carried by the inwardly extending portion of the slide 222 is a gear 238 rotatable about a longitudinal horizontal axis. The gear 238 meshes with a vertical rack 240 carried by the slide 192. Rotatably mounted in the inwardly extending portion of the slide 222 is a shaft 242 which extends longitudinally across the book opening station II of the machine. Secured to the shaft 242 is a gear segment 244 which meshes with the gear 238.

Carried by the shaft 242 are one or more blocks 246. The number of blocks may be varied but as shown there are three. These blocks can be clamped to the shaft and can be secured in various positions longitudinally thereof. Each block 246 carries a suction or vacuum cup 248 formed of rubber or other suitable material. The shaft 242 is hollow and a partial vacuum may be established therein. To this end the shaft is connected by means of a flexible hose or pipe 250 and by other piping, not shown, with a suitable vacuum pump 251 (Fig. 2) driven from the motor 12 by means of a belt 252 (Fig. 4). The connections between the hose 250 and the pump 251 extend through a valve mechanism 253, shown in Fig. 3, 17, 18 and 19, which will hereinafter be described in detail. The hollow shaft 242 is provided with a plurality of openings to which are connected short sections of flexible hose (not shown) which extend to the respective vacuum cups 248.

When relatively large books are to be handled each block 246 carries a supplemental block 256 provided with a vacuum cup 258 similar to the vacuum cup 248. Each vacuum cup 258 is connected with the interior of the shaft 242 by means of a short flexible hose 254.

In Figs. 1 and 8 a book B is shown at the book opening station with the covers C thereof in open horizontal positions. The filler of the book is shown at F. In Fig. 8 the covers C of the book are shown by dotted lines in the closed positions which they occupy when the book first reaches the book opening station. The timing of the machine is such that the blocks 246 and 256 and the vacuum cups 248 and 258 are at or near their book engaging positions, as shown by dotted lines in Fig. 8, when the book B first reaches the book opening station. Thereupon the vacuum cups 248 and 258 are engaged with the corresponding cover of the book and vacuum is established by means of the valve mechanism 253. Then the slide 222 is moved upwardly and the slide 192 is moved first outwardly and then inwardly by means of the mechanisms that have been described. Upward movement of the slide 222 causes the gear 238 to roll on the rack 240 and thus move in the clockwise direction. Movement of the gear 238 in the clockwise direction causes the gear 244 and the parts connected therewith, including the vacuum cups 248 and 258, to move in the counterclockwise direction, this being the direction for opening the corresponding book cover C. Inasmuch as the cover C must swing about its hinge connection with the back of the book, it is necessary for the axis of the shaft 242 to bodily move in an arcuate path concentric with the axis of the hinge. The cams which control the movements of the slide 222 and of the slide 192 are so formed that the axis of the said shaft 242 moves in the manner described, the shaft successively occupying the several positions shown by dotted lines in Fig. 8. It will be seen that the slide 222 moves continuously upward to move the shaft 242 from its lower position shown in dotted lines in Fig. 8 to its upper position shown in full lines in the said figure. Simultaneously, the slide 192 is moved so as to cause movement of the shaft 242 first outwardly and then inwardly during its upward movement, the axis of the shaft moving in an arcuate path as already described.

Slides 262 are provided, as shown in Fig. 2, which are guided in the brackets 194 so as to be movable horizontally and transversely. These slides are positioned adjacent one edge of the book opening station and preferably adjacent the retrograde edge thereof. Pivotally connected with each slide 262 near the outer end thereof is a link 264 (Fig. 8) which is pivotally connected at its outer end with a bell crank 266. The bell crank 266 is pivoted at 268 for movement about a horizontal longitudinal axis, and it has an inward extending arm which is connected with the before-mentioned shoe 200. The result is that the bell crank 266 is oscillated when the shoe 200 is moved upwardly and downwardly in the manner already described. It will therefore be seen that the slide 262 is reciprocated by means of the bell crank 266 and the link 264. The mechanisms for reciprocating the two slides 262 are so timed that the slides are moved inwardly simultaneously and outwardly simultaneously.

A book cover support is carried by each slide 262 and as shown in Figs. 2 and 4, this support is a horizontal longitudinal rail 270. The rail extends longitudinally across the book opening station. The elevation of the rail is such that its top surface is adapted to support or hold the corresponding cover of the book when in open position. The rail 270 may be additionally supported at its forward end by a separate horizontally and transversely movable slide which is not shown. The rail 270 is adjustable longitudinally of the slide 262 in accordance with the thickness and width of the book to be handled. It is secured in adjusted position with respect to the slide by means of a clamping screw 272 (Fig. 4) and adjustment is effected manually when the screw is released. After adjustment the screw is tightened to clamp the rail in its adjusted position.

The timing of the movements of the slide 262 and of the rail 270 carried thereby is such that the rail is out of the path of the cover as it swings upwardly, being approximately in the position shown by dotted lines in Fig. 8. As soon as the cover reaches its horizontal position as shown, the rail 270 is moved horizontally inward so as to support the cover. The rail is so adjusted with respect to the slide 262 that its inward position is such that the outer edge of the rail is substantially flush with the outer edge of the cover. At or shortly after the time that the rail 270 moves under the cover to support it, the vacuum is broken by the valve mechanisms 253, thus releasing the vacuum cups 248 and 258. The slide 222 may then be moved additionally upward sufficiently to separate the vacuum cups from the book cover so as to leave it free to be moved forwardly to the jacket applying station.

When the book has been moved forwardly to the jacket applying station, the several parts of the cover opening and supporting mechanisms are returned to their original positions and the before-described operation of the said mechanisms is repeated for the next following book.

As already stated, the number of blocks 246, 246 with their vacuum cups 248, 248 may be varied in accordance with the size of the book. Three blocks and three vacuum cups are shown and all of them may be used for a long book. For a shorter book it may be sufficient to use only two of them, or for a very short book only one of them. The supplemental blocks 256 and vacuum cups 258 are necessary or at least desirable for a wide book to defintely insure opening of the cover. For a narrow book it may be possible to omit the supplemental blocks and the supplemental vacuum cups. The blocks may be adjusted longitudinally of the shaft in accordance with requirements.

*Jacket placing mechanism*

The books are preferably opened by a book opening means of the character described, but whether such a book opening means is or is not provided, the books are moved automatically to a jacket applying position. When the books are moved intermittently as is preferred, the books are moved to a definite jacket applying station such as station III. The covers are maintained in their open positions by suitable supporting means to be described, and a flat jacket is transferred from a stack of jackets and placed in its proper position on the opened book with the edge portions thereof projecting beyond the edges of the covers. The edge portions of the jacket initially project beyond the edges of the covers and are subsequently folded by means to be described so as to be positioned adjacent the inner faces of the said covers. The combined steps of placing a jacket on the open book and of folding the edge portion of the jacket will be herein referred to as the steps of "applying" the jacket to the book. It will be understood that the word "applying," and related words, will designate both placing and folding.

The mechanism for placing the jacket on the books and the mechanism for folding the jackets are preferably both located at the same station which has therefore been designated as the "jacket applying" station. The mechanism for placing the jackets is in any event located at the said station, but the invenion is not necessarily limited to the location of the folding mechanism at the said station although this is desirable.

The preferred jacket placing mechanism will now be described in detail, particular reference being had to Figs. 1 to 4 and 9.

A stack of jackets S is supported on a vertically adjustable platform 274, preferably being above the path of movement of the books and in advance of the jacket applying station. The platform is provided with adjustable plates 276 and 277 for supporting the sides and end of the stack S. These plates are adjustable in accordance with the size of the jackets.

Suitably supported at a level above that of the platform 274 are two spaced horizontal guide rails 278 and 280. When the platform is in advance of the jacket applying station the rails 278 and 280 extend longitudinally and are positioned near the sides of the machine. The rails are formed with flanges which project inward as shown in Fig. 1. Longitudinally movable along the rails is a carrier comprising two similar supporting members 282 and 284 which are connected and held in spaced relationship by means of a transverse pipe 286 and by means of a transverse bar 287. The supporting members 282 and 284 are provided with rollers 288, 288 which engage the flanges of the respective rails 278 and 280 so that the carrier is supported and guided for longitudinal movement along the rails. The carrier is reciprocated through a fixed distance in properly timed relation with the other parts of the machine by means of links 290, 290 connected with arms 292, 292 mounted on a rockshaft 294. Secured to the rockshaft 294 is an arm 296 connected by means of a link 298 with an arm 300 which is oscillated by means of a cam on the main cam shaft 34.

Secured to the cross bar 287 are guide brackets 302, 302, three such guide brackets being shown but the number thereof being subject to variation. The guide brackets 302 are preferably adjustable longitudinally of the bar 287 which is provided with a plurality of holes for receiving screws to hold the guide brackets in any one of a variety of positions. Vertically movable in a guideway formed in each guide bracket 302 is a slide 304. Carried by the lower end portion of each slide 304 is a vacuum cup 306. Each vacuum cup 306 is connected by means of a flexible hose 308 with the pipe 286. A suitable hose or pipe connection 310 connects the pipe 286 with the before-mentioned valve mechanism 253 which serves to connect the hose or pipe connection 310 and the pipe 286 with the vacuum pump 251.

Mounted in suitable bearing apertures in the supporting members 282 and 284 is a transverse rotatable shaft 312. Splined to the shaft 312 and adjustable therealong are pinions 314 which mesh with rack teeth formed on the forward faces of the slides 304. The pinions 314 correspond in number to the guide brackets 302 and the slides 304 and are transversely movable to conform to the transverse adjustments of the brackets and slides. Secured to the shaft 312 at one end thereof is a pinion 316 which meshes with a horizontal rack 318 movable longitudinally in a guideway formed in the rail 278. Longitudinal movement of the rack 318 is effected by means of a link 320 connected with an arm 322 pivotally mounted on the shaft 294. The lower end of the arm 322 is connected by means of a link 324 with an arm 326 which is operated by a cam on the main cam shaft 34.

Figure 9:
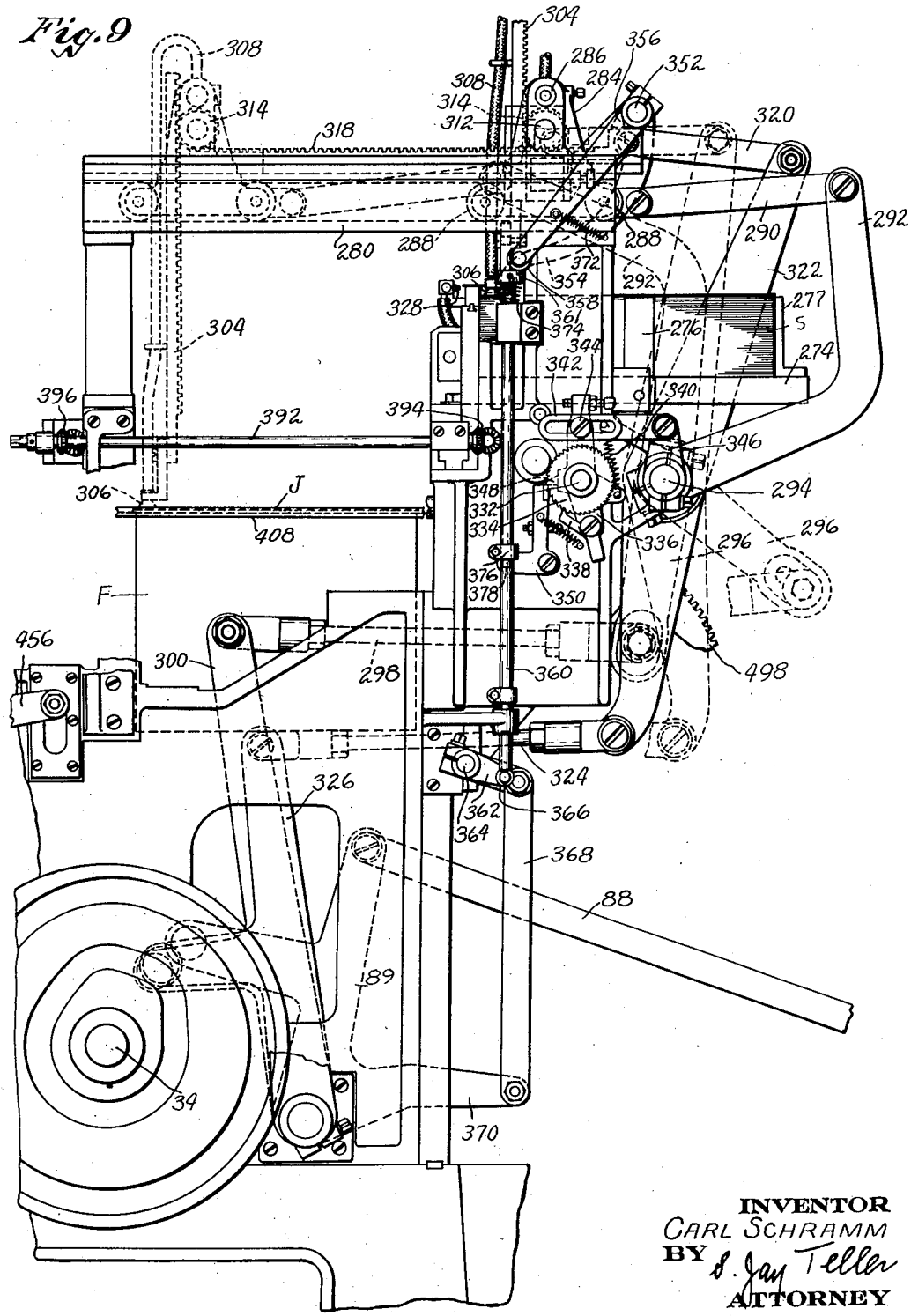
Fig. 9 is an enlarged fragmentary side view of the rear portion of the machine showing particularly the jacket placing mechanism.

It will be seen that if the rack 318 were stationary the pinion 316 would roll along the rack in the counterclockwise direction upon movement of the carrier in the retrograde direction, that is, toward the left as viewed in Fig. 9. Counterclockwise movement of the pinion 316 would cause the shaft 312 and the pinions 314 to rotate in the counterclockwise direction thus moving the slides 304 downwardly. Actually, however, the rack 318 is not stationary but is moved longitudinally in relation to the movement of the carrier so as to modify the vertical movements of the slides in a predetermined manner. It is desirable at the outset to effect a small upward movement of the slides and this is done by initially moving the rack 318 toward the front. Subsequently the rack 318 is moved in the retrograde direction to provide downward movement of the slides additional to that which would be effected if the rack were stationary. It will be understood that the cams for operating the carrier and the rack are so designed and formed as to effect the movements of the said parts in the manner described.

In considering the operation of the jacket applying mechanism the parts can be regarded as initially in the position shown in Fig. 9 with the vacuum cups 306, 306 in engagement with the jacket at the top of the stack S. By means of the valve mechanism 253 vacuum is applied to the vacuum cups and by relative movements of the carrier and of the rack 318 the slides 304 with their vacuum cups are moved first upwardly and then rearwardly and downwardly so as to transfer a jacket and place it upon the back and opened covers of the book in the jacket applying station. The edge portions of the jacket project beyond the edges of the book covers. One or more air jets 328 may be provided to direct air against the rear edge of the jacket engaged by the vacuum cups to prevent the lifting of more than one jacket at a time. The jacket is placed upon the book with its retrograde edge in vertical register with the retrograde edge of the book covers. As soon as each jacket is in place on the opened book the vacuum in the vacuum cups is released and the mechanism returns to the position shown in Fig. 9. The described operation is repeated for each jacket and each book.

The timing of the jacket placing mechanism is such that a jacket is picked up from the stack just before the covers of the book in the book opening station are fully opened. During the transfer of the jacket in the retrograde direction and downward, the book in the book opening station is moved forward to the jacket applying station so as to reach the said station practically simultaneously with the arrival of the jacket in position to be placed thereon.

Inasmuch as each book is moved intermittently by the engagement of a pusher 78 therewith, it will be seen that the retrograde edge of the book in the jacket applying station is always in a predetermined position regardless of the length of the book. The jacket applying mechanism is not arjustable for the length of the book, and it acts to apply the jacket with the retrograde edge thereof always in the same predetermined position, which position is in register with the aforesaid predetermined position of the retrograde edge of the book.

The platform 274 is automatically movable vertically so as to maintain the top of the stack S always at the same elevation. Any usual or preferred mechanism may be provided for this purpose but one suitable mechanism is shown in the drawings and will be described. Vertical adjustment of the platform 274 is effected by means of two rotatable screws 330, 330 which are connected by means of suitable bevel gearing 331 (Fig. 15) with a horizontal shaft 332, which shaft carries a toothed ratchet wheel 334 at the right side of the machine. Rotatably mounted on the shaft 332 is an arm 336 carrying a pawl 338 which engages the teeth on the ratchet wheel. A spring 340 tends to move the arm 336 in the counterclockwise direction. For oscillating the arm 336 there is provided a slotted link 342, a screw or stud 344 on the arm 336 extending through the slot in the link. The link 342 is pivotally connected with an arm 346 secured to the rockshaft 294. Thus the link 342 is continuously reciprocated during operation of the machine but by reason of the slot in the link the arm 336 is not necessarily oscillated by the link. The arm 336 has a rearward toothed projection 348 which is behind the ratchet wheel 334 being shown by dotted lines in Fig. 9. The toothed projection 348 is normally engaged by a spring-pressed pawl 350 so as to be held in the position shown in Fig. 9 notwithstanding the action of the spring 340 which tends to move the arm in the counterclockwise direction. Thus the stud 344 is normally held in the position shown in Fig. 9 and the link 342 reciprocates without moving the arm 336.

Extending transversely across the top of the machine above the platform 274 is a rockshaft 352 which carries a finger 354 adapted to engage the top of the jacket stack S. Secured to one end of the rockshaft is an arm 356 provided with a roller 358. Vertically movable in suitable guides at the side of the machine is a rod 360 having a button 361 at the upper end thereof which is engaged by the roller 358. The rod 360 is normally reciprocated by means of a pin carried by an arm 362 on a rockshaft 364. The rockshaft 364 is provided with an arm 366 which is connected by means of a link 368 with an arm 370 which may be formed integrally with the before-mentioned arm 89. The arm 89 is oscillated during each cycle of the machine and thus the rod 360 is reciprocated vertically during each cycle. A spring 372 connected with the arm 356 tends to hold the roller 358 against the button 361 at the top of the rod 360 and thus tends to hold the bottom of the rod against the pin on the arm 362. A spring 374 biases the rod 360 upwardly, but the spring 372 is sufficiently strong to overcome the action of the spring 374. An adjustable collar 376 is secured to the rod 360 and this is adapted to engage a transverse pin 378 on a rearward extension of the before-mentioned pawl 350.

Downward movement of the rod 360 during each cycle is limited by the engagement of the finger 354 with the top of the stack, such engagement being effected while the jacket transferring parts are in their forward positions. By reason of the spring 374 the rod does not normally move downwardly as far as would be permitted by the pin on the arm 362 but only as far as it is moved by the arm 356 and the spring 372. However, as successive jackets are removed from the top of the stack the level of the said top is lowered and this permits the finger 354 to move farther than normally thus causing the rod 360 to move downwardly to an extent greater than normal. When the rod 360 thus moves downwardly to an extent beyond normal, the collar 376 engages the pin 378 to rock the pawl 350 in the counterclockwise direction and disengage it from the projection 348 on the arm 336. This permits the arm 336 to move in the counterclockwise direction under the influence of the spring 340, thus moving the stud 344 toward the left as viewed in Fig. 9. As already explained, the link 342 is continuously reciprocating and upon the next movement thereof toward the right the stud 344 is engaged so as to be returned to the position shown in Fig. 9. The arm 336 is thus moved in the clockwise direction, the pawl 338 engaging the ratchet wheel 334 to rotate the shaft 332 in the clockwise direction. By reason of the bevel gear connections 331 with the screws 330, 330 the said screws are turned and the platform 274 is moved upwardly. Movement of the arm 336 in the clockwise direction restores the projection 348 thereon to the position shown in Fig. 9, in which position it is again engaged by the pawl 350. The described operation of the aforesaid parts occurs whenever the top of the stack is below a predetermined level with the result that the said top of the stack is repeatedly restored to the said predetermined level.

*Jacket holding and folding mechanism as shown in Figs. 10 to 14*

After a jacket has been placed upon the back and open covers of the book by the jacket placing mechanism that has been described, the projecting edge portions of the jacket are folded so as to bring them adjacent the inner faces of the said book covers. The folding preferably takes place immediately following the placing of the jacket and while the book is at the jacket applying station, but as to this there may be variation. One mechanism for folding the jackets and for holding them during folding will now be described in detail, particular reference being had to Figs. 10 to 14.

Extending transversely of the machine are two horizontal supporting rails 380 and 382, these rails being positioned above the path of movement of the books and respectively adjacent the advance and retrograde edges of the jacket applying station. The said rails 380 and 382 serve to support the jacket holding and folding mechanisms and also certain other parts. As more clearly shown in Fig. 11, the said rails 380 and 382 are provided respectively with guideways in which are transversely movable slides 384 and 386. The slides 384 and 386 appearing in Fig. 11 are at the right side of the machine but other similar slides are provided at the left side of the machine, these latter slides not being shown in the drawings. The folding mechanisms at the two sides of the machine are carried by and are movable with the respective slides and are similar to each other except for reversal. The description will for the most part be confined to the mechanism at the right side of the machine.

Secured to the respective slides 384 and 386 are supporting blocks 388 and 390, the upper faces of the blocks being in contact with the bottom faces of the rails. The slides 384 and 386 at the two sides of the machine, together with the blocks 388 and 390 carried thereby, are transversely adjustable in accordance with the thickness and width of the books being handled, and mechanism is preferably provided for effecting adjustment in opposite directions and to uniform extents. A rotatable longitudinal shaft 392 is provided at one side of the machine as for instance at the right side, this shaft being squared at one end for engagement by a wrench or crank. The shaft 392 is connected by bevel gearing 394 and 396 with two transverse shafts 398 and 400 which extend along the respective rails 380 and 382. The end portions of the shafts 398 and 400 are oppositely threaded and extend through threaded brackets 402 and 404 rigidly secured to the respective supporting blocks 388 and 390. It will be seen that by turning the shaft 392 the shafts 398 and 400 can be turned uniformly to effect adjustments of the supporting blocks 388 and 390 for the two folding mechanisms, together with the corresponding slides 384 and 386, in opposite directions and to uniform extents. The slides and blocks can be locked in adjusted positions by clamping screws 406 and 407.

Carried by the blocks 388 and 390 is a longitudinal rail 408 which serves to support or hold the corresponding cover C of the book in its open position. The outer edge of the rail 408 is preferably not flush with the edge of the cover but is spaced outwardly therefrom as clearly shown in Fig. 13. The rail 408 has a longitudinal recess 410 in its upper face, the depth of the recess being approximately the same as the thickness of the book cover C. The surface at the bottom of the recess 410 is at the same elevation as the top surface of the rail 270 at the book opening station. The outer edge of the rail 408 is thin and rounded as shown in Fig. 12, and the bottom face of the rail is inclined as shown at 412 for a purpose to be presently described. The retrograde end of the rail 408 is rigidly secured to an extension 414 on the retrograde supporting block 390 and the advance end of the rail is normally supported by the advance supporting block 388 by means to be presently described in detail. It will be seen that at the retrograde end the rail 408 is supported at the bottom thereof so that the cover of the book can slide from the before-described rail 270 onto the rail 408. In effecting adjustments for books of different thicknesses and widths, the rail 408 is so positioned with relation to the rail 270 that the cover C will slide into the recess 410 preferably with a small clearance between the outer edge of the cover and the inner end of the recess.

Mounted in suitable bearing apertures in the blocks 388 and 390 is a longitudinal shaft 416. Rotatably mounted on the shaft 416 is a sleeve 418 having pinions 420 and 422 preferably formed integrally therewith. Rigidly secured to the shaft 416 adjacent the ends of the sleeve 418 are brackets 424 and 426 which constitute a carrier formed with guideways for a jacket folding member or plate 428 which is transversely movable in the said guideways. The plate 428 is provided with racks 430 and 432 which mesh respectively with the pinions 420 and 422.

Figure 13:
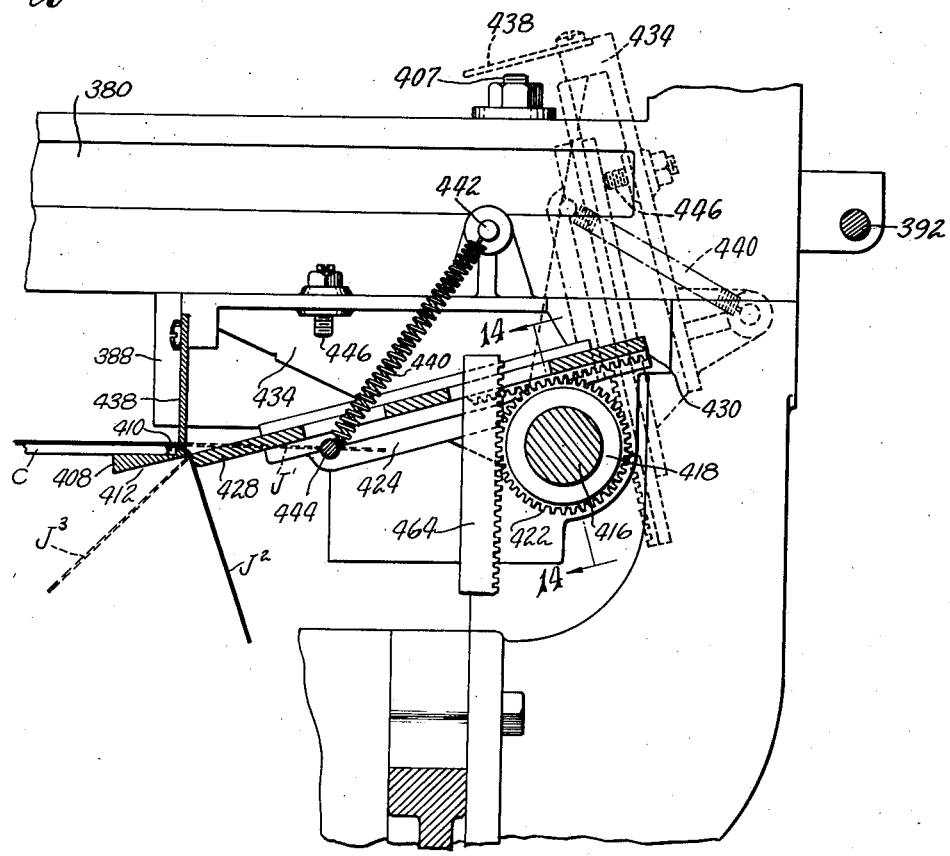
Fig. 13 is an enlarged transverse sectional view taken along the line 13—13 of Fig. 14.

Loosely mounted on the shaft 416 between the brackets 424 and 426 and the adjacent blocks 388 and 390 are brackets 434 and 436 which constitute a carrier for a transverse jacket holding member or plate 438. The plate 438 is so positioned that the lower edge thereof can engage the top of the rail 408 between the outer edge thereof and the edge of the recess 410, as shown in Fig. 13. As already stated, the brackets 434 and 436 and the plate 438 are freely movable on the shaft 416 and springs 440, 440 are provided which bias the said brackets and the said plate for movement in the counterclockwise direction with respect to the brackets 424 and 426 and the plate 428. The springs 440, 440 are connected with pins 442, 442 on the brackets 434 and 436 and are connected with pins 444 on the brackets 424 and 426. The plate 428 is provided with holes through which the springs extend. Relative movement of the brackets 434 and 436 and of the plate 438 is limited by adjustable stops 446, 446.

The shaft 416 can be rocked or oscillated to move the brackets 424 and 426 and the parts associated therewith between the positions shown by full lines in Fig. 13 and the positions shown by dotted lines in the same figure. For effecting such oscillation the shaft 416 carries at its retrograde end a pinion 448 which meshes with a vertically movable rack 450, as more clearly shown in Fig. 10. The rack 450 is provided adjacent its lower end with a roller 452 which is entered in a horizontal transverse groove 453 in a vertically movable slide 454. The slide 454 is reciprocated by means of a bell crank 456, a link 458, a lever 460 and a lever 461. The lever 461 carries a cam follower engaged in a cam groove in the aforesaid cam 36 on the main cam shaft 34. It will be seen that through the described mechanism the cam can effect the vertical movement of the slide 454 which in turn effects vertical movement of the rack 450, the said rack causing the shaft 416 to oscillate. The horizontal groove 453 in the slide 454 permits transverse adjustment of the folding mechanism without interfering with the described vertical movement of the rack 450.

Figure 14:
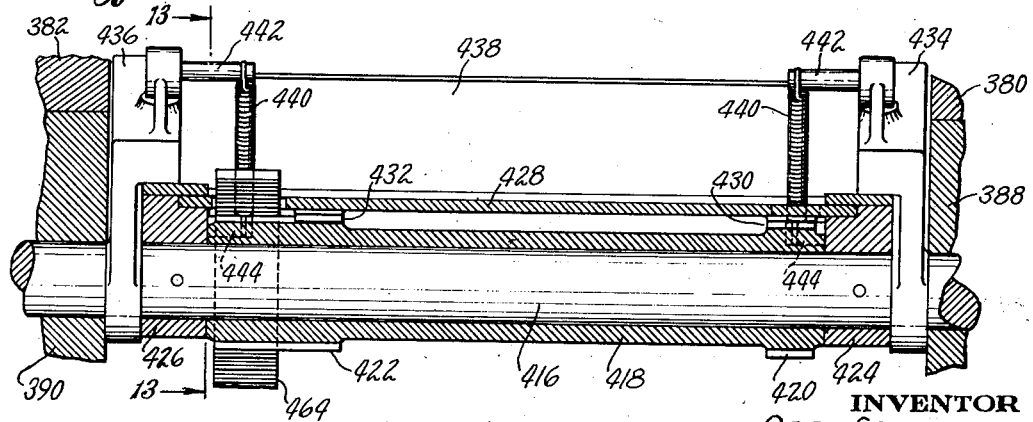
Fig. 14 is a sectional view taken along the line 14—14 of Fig. 13.

For oscillating the sleeve 418 on the shaft 416 there is provided a vertically movable rack 464 which meshes with the retrograde end of the pinion 422 as shown in Figs. 2, 13 and 14. The plate 428 has an aperture through which the upper end of the rack can project. The rack 464 is provided with a shoe 466 which is entered in a horizontal transverse groove in a vertically movable slide 468. The slide 468 is operable by a bell crank 469 and other mechanism in properly timed relationship with the other parts by mechanism which is not shown but which is operated by a cam on the main cam shaft 34. The horizontal groove in the slide 468 permits transverse adjustment of the folding mechanism without interfering with the described vertical movements of the rack 464.

The timing of the machine is such that the several parts of the jacket holding and folding mechanism are in the positions shown by dotted lines in Fig. 13, while the jacket is being transferred from the stack and placed on the back and covers of the book by the mechanism for that purpose which has been described. In this position the plate 438 is moved sufficiently to clear the jacket as it moves into place, the jacket being at that time flat. The jacket is initially in the position shown by dotted lines at J¹ in Fig. 13. At least as soon as the jacket has been applied and preferably slightly therebefore, the shaft 416 and the sleeve 418 are started to move in unison in the counterclockwise direction. This movement is effected by the respective mechanisms that have been described and the several parts are moved from the dotted line positions shown in Fig. 13 to the full line positions shown in the same figure. This brings the plate 438 into engagement with that portion of the jacket which is above the rail 408 and the plate 438 serves to hold the jacket in place during the folding operation which immediately follows. Motion of the plate 438 is stopped at the position shown by full lines, but the brackets 424 and 426 continue to move until they reach the positions shown by full lines, thus tensioning the springs 440, 440 and thus causing the plate 438 to exert increased pressure against the jacket. As the inner edge of the jacket folding plate 428 passes the edge of the rail 408 the jacket is partly folded, being moved from the dotted line position J¹ to the full line position J². As soon as the plate 428 reaches the full line position shown in Fig. 13 the sleeve 418 on the shaft 416 is additionally turned in the counterclockwise direction independently of the shaft 416 to move the plate 428 toward the left from the full line position shown in Fig. 13, the plate 428 thus moving along the bottom inclined face 412 of the rail 408 and completing the folding of the jacket. It will be understood that during this folding operation the jacket is firmly held in place as before-described by the plate 438. The sleeve 418 is then turned in the clockwise direction independently of the shaft 416 so as to return the plate 428 to the position shown in full lines. The edge portion of the jacket, by reason of gravity and by reason of its own resiliency, will drop to an intermediate position such as the position J³ shown by dotted lines in Fig. 13, but it is nevertheless adjacent the inner face of the book cover. The shaft 416 and the sleeve 418 are then turned in unison in the clockwise direction to free the jacket and to restore the jacket holding and folding mechanism to the position shown by dotted lines in Fig. 13.

It will be understood that in applying a jacket to a book, and particularly in the folding of the jacket, a definite or predetermined amount of looseness or slack must be provided in the jacket between the two opposite folds thereof in order to permit the book to be closed with the folded jacket in place and without unduly tensioning the jacket. While I do not necessarily so limit myself, the before-described rails 408 preferably constitute the means for providing the necessary slack in the jacket. As is shown and as has been described, the outer edges of the rails 408 are spaced outwardly beyond the edges of the book covers C and the jacket is folded around the edges of the rails and not directly around the edges of the book covers. The outer edges of the rails constitute folding guides and thus the rails 408 provide the required slack in the folded jacket. The amount of slack required may vary with the size of the book and this can be taken care of in the initial adjustment of the machine. In setting up the machine the folding mechanism can be so adjusted as to provide within reasonable limits any desired spacing between the edge of the cover C and the outer edge of the rail 408, thus varying the amount of jacket slack.

The rail 408 must be supported at its advance end during folding of the jacket in order to resist the pressure applied thereto by the holding plate 438. However, the rail support at the advance end must be released and moved out of position in order that it may not interfere with the cover and jacket as the book is moved out of the jacket applying station to the next following station. A suitable rail supporting latch and the operating mechanism therefor are shown in Figs. 3, 11 and 12.

As shown more clearly in Fig. 11, there is provided a latch 470 which is pivotally movable about a transverse axis, being supported on a pin 472 projecting inward from the block 388. The latch 470 has a notch 474 which is adapted to receive the advance end of the rail 408. When the latch is in the position shown by full lines in Fig. 11 it firmly supports the advance end of the rail. Preferably, the latch carries a plate 476 which engages the inner edge of the rail to prevent inward deflection of the rail by reason of pressure applied thereto by the plate 438. A coil spring 478 (Fig. 3) is provided which biases the latch for movement in the clockwise direction, as viewed in Fig. 11, to the dotted line position shown in that figure.

Secured to the advance end of the shaft 416 is a pinion 480, as shown in Fig. 3, which meshes with a vertically movable rack 482. The rack 482 carries an inwardly projecting arm 484 which serves when moved vertically downwardly to move the latch 470 to its rail engaging position, as shown in Fig. 11, and to hold it in the said position. When the arm 484 is moved upwardly it disengages the latch and the latch is moved by the spring 478 to its inoperative dotted line position as shown in Fig. 11. When the parts of the holding and folding mechanism are in the positions shown by full lines in Fig. 13, the rack 482 and the arm 484 are in their lower latch holding positions. When the shaft 416 is rocked to move the holding and folding mechanism to the position shown in dotted lines in Fig. 13, the pinion 480 is moved in the counterclockwise direction as viewed in Fig.

3, thus moving the rack 482 and the arm 484 upwardly to release the latch 470 in the manner already described. The latch is retained in its released position until the book with the jacket applied thereto has been moved out of the jacket applying position. Then the latch is restored to its operative rail engaging position as the holding and folding mechanism is moved from the dotted line position shown in Fig. 13 to the full line position shown in that figure.

It will be understood that during the operation of the jacket holding and folding mechanism the vacuum cups of the jacket placing mechanism are moving upward and forward so as to be ready to start the transfer of the next following jacket just before the book with the folded jacket thereon is moved out of the jacket applying station.

The folding rails or guides 408 and the folding mechanism have been described in their specific disclosed relationship with various other parts. It will be understood, however, that the invention is not necessarily limited to the said relationship with other parts and that in its less limited aspects the invention relates broadly to mechanism for folding and forming the jackets around the guides independently of the edges of the book covers.

Jacket moving mechanism

When the book and the applied jacket are moved out of the jacket applying station to the next following station, the jacket is not firmly engaged with the book and is in fact engaged with the rails 408 about which the edge portions of the jacket have been folded. The book is moved from the jacket applying station to the next following station primarily by the corresponding pusher 78 on the chain 70 and if dependence were placed entirely on the pusher the jacket might remain on the rails 408 or in any event it might not be moved in exact unison with the book. In order to positively assure movement of the jacket in unison with the book, a jacket moving mechanism is provided which will now be described, reference being had particularly to Figs. 3 and 15 and 16.

Two longitudinally movable slides 486 are provided, these being movable in guideways formed in brackets 488 secured to the before-mentioned slides 384. Inasmuch as the slides 384 are adjustable inwardly and outwardly in accordance with the thickness and width of the books, it will be seen that the brackets 488 and the slides 486 are similarly adjusted. Each bracket 488 in addition to being supported on the slide 384 may be additionally connected with the corresponding block 388 by means of a tie rod 490.

Extending transversely of the machine is a rotatable shaft 492 to which are splined pinions 494 contained within recesses in the brackets 488. These pinions 494 mesh with rack teeth formed in the upper faces of the slides 486. Secured to the shaft 492 at one end thereof, for instance at the left end thereof, is a pinion 496. Meshing with the pinion 496 is a gear segment 498 carried by a rockshaft 500. The shaft 500 is rocked or oscillated in properly timed relationship with other parts of the machine by mechanism not shown.

Figure 16:
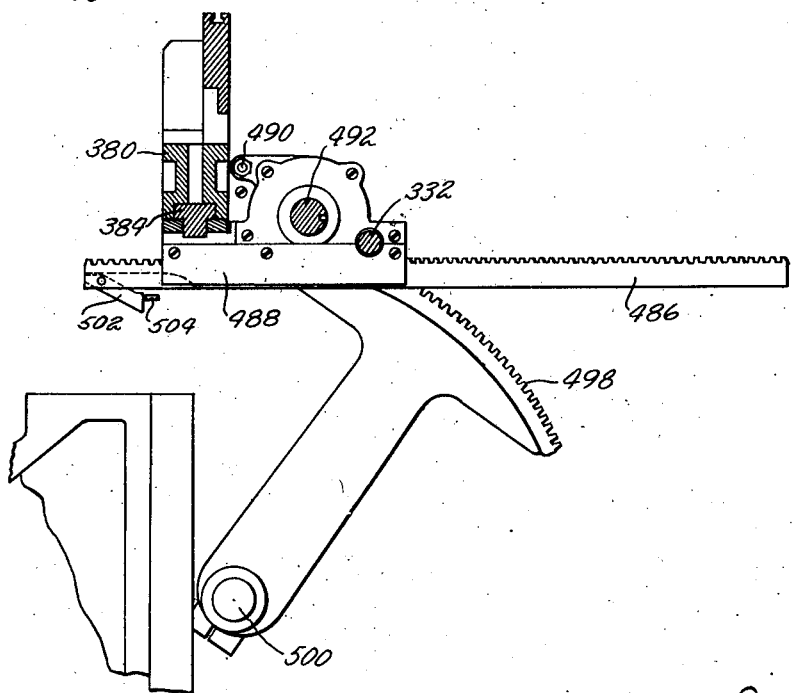
Fig. 16 is a combined sectional and elevational view taken along the line 16—16 of Fig. 15.

Carried by the slides 486 at the forward ends thereof are latches 502 which are normally held by gravity in the position shown in Fig. 16, but which can swing upward. Each latch carries a forward projecting pin 504.

Figure 15:
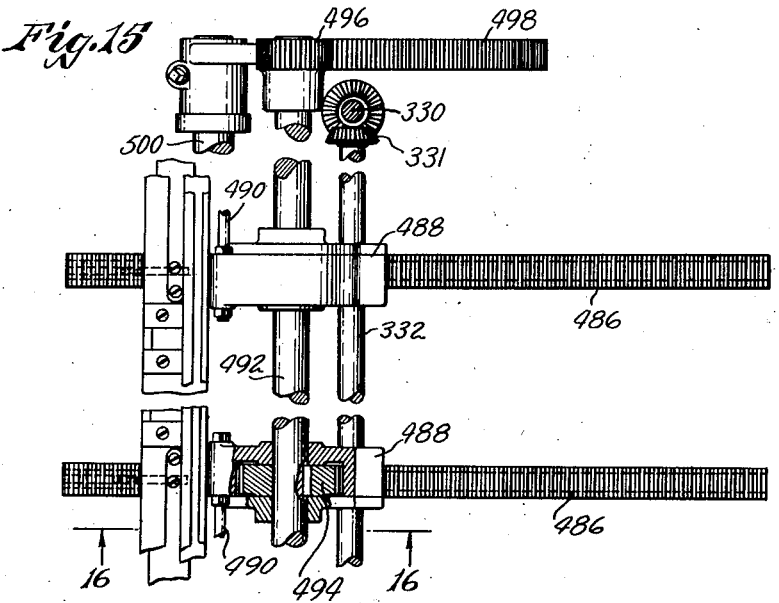
Fig. 15 is an enlarged fragmentary plan view of the jacket moving mechanism.

The mechanism shown in Figs. 15 and 16 is so timed that the slides 486, 486 are moved in the retrograde direction immediately following the applying of the jacket to the hook, and preferably while the jacket is held by the holding plates 438. During such retrograde movement the latches 502 move along the top of the jacket on the book covers and the retrograde motion is continued far enough to permit the latches 502 to drop downwardly behind the retrograde edges of the book covers, downward movement of the latches being limited by the pins 504. The timing is such that when the book is moved out of the jacket applying station by the corresponding pusher 78, the latches 502 are moved in exact unison therewith, thus insuring the movement of the jackets with the books. The latches 502 remain in engagement with each jacket until it is disengaged from the rails 408, 408.

It will be observed that the jacket moving mechanism serves not only to normally move the jacket in unison with the book but also serves to correct any possible inaccuracy in the placement of the jacket on the book. If the jacket placing means does not place the jacket with its retrograde edge in accurate register with the retrograde edges of the covers, the deviation from exact register is corrected.

Mechanism for controlling book opening and jacket placing mechanisms

As has already been stated, the covers of the books are opened by means of vacuum cups 248 and 258 and the jackets are transferred from the stack S and onto the opened books by means of vacuum cups 306. The said vacuum cups are connected with or disconnected from the vacuum pump 251, in proper timed relationship with their respective movements, by means of the valve mechanism 253 shown in Figs. 3, 17, 18 and 19. The various pipes for connecting the vacuum cups with the valve mechanism and for connecting the valve mechanism with the pump are shown only fragmentarily as the invention does not involve any details of piping arrangements.

The valve mechanism 253, as shown in detail in Figs. 17 to 19, comprises a casing 506 in which are movable two plungers 508 and 510. These plungers are movable in unison by means of a link 512 which is connected to be reciprocated in proper timed relationship with the other parts of the machine. The pipes 250 which are connected with the cover opening vacuum cups 248 and 258 are connected by means of a pipe 514 with a port 516 in the casing 506 communicating with the recess for the plunger 508. Opposite the port 516 is a second port 518 also communicating with the last said recess and connected by means of a pipe 520 with the vacuum pump 251. The plunger 508 has a transverse hole 522 which registers with the ports 516 and 518 when the parts are in the position shown in Fig. 17. The plunger 508 has a second transverse hole 524 which is longitudinally elongated and which is also adapted to register with the said ports 516 and 518. A longitudinal hole 526 is provided in the plunger 508 which communicates with the hole 522 and also with the external atmosphere. When the hole 522 is in register with the ports 516 and 518 communication with the external atmosphere is established and no vacuum is applied to the vacuum cups 248 and 258. However, when the plunger 508 is moved to bring the hole 524 into register with the ports 516 and 518 a vacuum connection is established from the pump to the vacuum cups.

The pipe or hose connection 310 which is connected with the jacket transfer vacuum cups 306 is connected by means of a pipe 528 with a port 530 in the casing 506 communicating with the recess for the plunger 510. Opposite the port 530 is a second port 532 also communicating with the last said recess and connected by means of a pipe 534 with the vacuum pump 251. The plunger 510 has a transverse hole 536 which is adapted to register with the ports 530 and 532. The plunger 510 has a second transverse hole 538 which is longitudinally elongated and which registers with the said ports 530 and 532 when the parts are in the positions shown in Fig. 17. A longitudinal hole 540 is provided in the plunger 510 which communicates with the hole 536 and also with the external atmosphere. When the hole 536 is in register with the ports 530 and 532 communication with the external atmosphere is established and no vacuum is applied to the vacuum cups 306. However, when the plunger 510 is so positioned that the hole 538 is in register with the ports 530 and 532 a vacuum connection is established from the pump to the vacuum cups.

When the valve mechanism is in the position shown in

Fig. 17 and also in the diagrammatic Fig. 20, the vacuum cups 248 and 258 of the cover opening mechanism are about to move into engagement with the covers of the book in the book opening station, as shown by dotted lines in Fig. 8. As soon as the vacuum cups have engaged the book covers the valve mechanism is moved to the position shown in Fig. 21 so as to establish a vacuum connection to the vacuum cups in the manner already described. The valve mechanism is moved from the position shown in Fig. 21 successively to the positions shown in Figs. 22 and 23, the vacuum in the vacuum cups being maintained. During this period the vacuum cups are swung outward and upward as already described and the rails 270, 270 are moved under the book covers to support them, as shown by full lines in Fig. 8. As soon as the book covers are supported by the rails the valve mechanism is moved from the position shown in Fig. 23 to the original position shown in Fig. 20, the vacuum in the cups being then broken so as to free the covers of the books.

The plunger 510 which controls the jacket placing mechanism moves simultaneously with the plunger 508 which controls the cover opening mechanism. The relationship of the several holes in the two plungers 508 and 510 is such that vacuum is supplied to the jacket transfer vacuum cups 306 just before the vacuum is broken in the vacuum cups 248 and 258 of the cover opening mechanism. This will be apparent from an inspection of Fig. 23. When the valve mechanism is in the position shown in Fig. 23, the vacuum cups 306 are in positions to engage a jacket on the stack S as shown by full lines in Fig. 9, and a vacuum is established to the said cups to enable them to pick up a jacket. As the jacket mechanism carrying a jacket moves rearward and downward to place a jacket on a book, the valve mechanism moves successively from the position shown in Fig. 23 to the positions shown in Figs. 20 and 21. As soon as the jacket has been applied to a book in the jacket applying station, as shown by dotted lines in Fig. 9, the valve mechanism moves to the position shown in Fig. 22 thus breaking the vacuum and releasing the jacket.

As already explained, the transfer of the jacket for each book starts just before the completion of the opening of the covers of the same book. If for any reason a book is not supplied to the book opening station or if for any reason the opening mechanism fails to open one or both covers of the book at the said station, the action of the jacket placing mechanism should be interrupted so that no jacket will be transferred to the jacket applying station. An automatic mechanism for effecting interruption of the action of the jacket placing mechanism under the circumstances stated is preferably provided and this will now be described.

Carried by the plunger 508 is an apertured block 542 having a longitudinal aperture 544 which communicates with a longitudinal hole 546 in the plunger 508 intersecting the hole 524. The block 542 has a transverse aperture 548 which communicates with the aperture 544. A supplemental plunger 550 is provided which is slidably movable in the aperture 548, outward movement thereof being limited by means of a central rod 552 which extends through the end of the block. A spring 554 tends to hold the plunger 550 in its outer position, as shown in Fig. 17. It will be seen that when a vacuum connection is established through the hole 524 to the vacuum cups 248 and 258 for opening the book covers, vacuum is also established to the interior of the block 542 so that the plunger 550 is drawn inward from the position shown in Fig. 17. However, if the vacuum in the hole 524 is broken by failure of the vacuum cups 248 and 258 to properly engage one or both covers of a book, the plunger 550 is not withdrawn, as dscribed, but is retained by the spring 554 in its outer or projected position, as shown in Fig. 17.

Longitudinally movable in a recess in the casing 506 is a hollow plunger 556. A longitudinally movable rod 558 fits within the plunger 556, the two parts being relatively movable within predetermined limits as determined by a pin 560 and a slot 562. A coil spring 564 positioned within the plunger 556 normally serves to hold the plunger in its extreme right hand position with respect to the rod 558 as determined by the pin and slot connection. The rod 558 is reciprocated in properly timed relationship with other parts of the valve mechanism by means of a link 566 and it will be understood that the rod and the plunger normally move in unison.

The casing 506 is provided with a port 568 which extends between the recess for the plunger 510 and the recess for the plunger 556. The plunger 510 has a transverse hole 570 which is adapted to register with the port 568 when the plunger 510 is in the positions shown in Figs. 21 and 23. The plunger 556 has a port 572 which can be brought into register with the port 568 when the plunger is reciprocated. The port 572 communicates with the external atmosphere through the open end of the hollow plunger.

When the plunger 510 is in the positions shown in Figs. 21 and 22 and in intermediate positions, the plunger 556 is so positioned that the port 572 is out of register with the port 568 being at the left thereof as shown. However, immediately after the plunger 510 reaches the position shown in Fig. 22, the plunger 556 is very quickly moved toward the right to the position shown in Fig. 23. In this last said position the port 572 is out of register with the port 568, but is at the right thereof instead of at the left thereof. As the plunger 510 moves from the opsition shown in Fig. 23 to the position shown in Fig. 20, the plunger 556 is moved toward the left back to its original position. Fig. 20 shows the plunger 556 in an intermediate position during its leftward movement.

The described movements of the plunger 556 are those which normally take place. However, if no book is in the book opening station, or if a book in the said station is not properly engaged by the vacuum cups, the vacuum is broken and the plunger 550 moves to its projected position as already fully described. With the plunger 550 in its projected position it engages the end of the hollow plunger 556 to prevent the normal movement thereof. This is shown in Fig. 24 wherein the positions of all of the parts except the plunger 550 and the plunger 556 are the same as in Fig. 23. It will be understood that the rod 558 moves normally, but the lost motion connection of the plunger with the rod permits the motion of the plunger to be stopped, the spring 554 being compressed. With the movement of the plunger 556 stopped by the plunger 550, the port 572 instead of being at the right of the port 568 is held in register therewith, as shown in Fig. 24. At the same time the hole 570 in the plunger 510 is also in register with the port 568. This connects the hole 538 with the external atmosphere and breaks the vacuum which would otherwise be established to the jacket transfer vacuum cups 306. With no vacuum in the cups 306 they do not pick up a jacket from the stack S and the jacket transfer mechanism goes through its motions idly without transferring a jacket.

The mechanism described serves to definitely prevent the transfer of a jacket to the jacket applying station when there is no book or no properly opened book in the said station to receive the jacket. Without the described mechanism a jacket would be transferred to the jacket applying station during each cycle of the machine and with no book, or no properly opened book, in position to receive the transferred jacket, it would become entangled with the mechanism of the machine and it would probably be necessary to shut down the machine to remove the jacket.

*Book closing mechanism as shown in Fig. 3*

Immediately following the application of a jacket to a book at the jacket applying station, the book and the jacket are moved by the corresponding pusher 78 and by the latches 502, 502 to the next following station which has been designated as the book closing station. Actually, the covers of the book are closed by gravity and the parts at the so-called book closing station merely serve to control the gravital movement of the covers and to insure that the jacket is maintained in proper position in contact with the inner faces of the covers.

Figure 25:
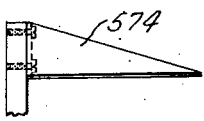
Fig. 25 is a fragmentary elevational view taken along the line 25—25 of Fig. 3.

The covers of the book start to close as soon as they pass off from the ends of the supporting rails 408, 408, and this may be shortly before the end of the movement of the book out of the jacket applying station. In order to retard the closing movements of the covers inclined plates 574, 574 are provided, as shown in Figs. 3 and 25. The retrograde edges of the covers C of the book initially engage the edges of the plates 574, 574. Upon the next movement of the book out of the final or book closing station the said retrograde edges of the covers follow downward along the edges of the plates.

Suitable means are provided to insure the maintenance of the folded edge portions of the jackets against the inner faces of the covers during closing. Air nozzles 576, 576 are shown in Fig. 3 for this purpose, and these nozzles serve to direct air against the folded portions of the jackets to hold them in place against the inner faces of the covers. These air jets may act continuously or intermittently as preferred.

*Alternative jacket holding and folding mechanism as shown in Figs. 26 to 30*

Jacket holding and folding mechanisms, such as shown in Figs. 10 to 14 and as hereinbefore described, are suitable for jackets having little resiliency and which tend to remain in their folded positions. Such jackets readily take a permanent set upon folding and do not open by gravity or by their own resiliency substantially beyond the position indicated at J³ in Fig. 13. When the machine is to be used for jackets which do not so readily take a permanent set upon folding and which tend to open after folding to substantially greater extents, it is preferable to provide alternative holding and folding mechanisms such as shown in Figs. 26 to 30.

The alternative folding mechanisms at the two sides of the machine are similar, except for reversal, and the description will be confined for the most part to the mechanism at the right side of the machine as viewed from the front, or the left side as viewed from the rear. The folding mechanisms are carried by slides 578 and 580 similar to the slides 384 and 386 and similarly movable along the rails 380 and 382. The slides 578 and 580 are transversely adjustable by the mechanism already described for the slides 384 and 386.

Secured to the respective slides 578 and 580 are supporting blocks 582 and 584 which correspond respectively to the supporting blocks 388 and 390. Carried by the blocks 582 and 584 is a longitudinal rail 586, corresponding in function to the rail 408. The rail 586 preferably comprises a body portion 588 and a separate thin folding portion 590, the said portions being connected with each other in any suitable manner. The outer edge of the rail portion 590 is preferably not flush with the edge of the book cover C but is spaced outwardly therefrom as clearly shown in Fig. 26. The rail portion 590 has an upturned edge, thus providing a recess 592 in the upper face of the rail. The total thickness of the rail portion 590 at the said upturned edge thereof is approximately the same as the thickness of the book cover C. The surface at the bottom of the recess 592 is at the same elevation as the top surface of the rail 270 at the book opening station. The retrograde end of the rail 586 is rigidly secured to an inward extension 594 on the retrograde supporting block 584 and the advance end of the rail is normally supported by the advance supporting block 582 by means to be presently described in detail. It will be seen that the retrograde end of the rail 586 is supported at the bottom thereof so that the cover of the book can slide from the before-described rail 270 onto the rail portion 590. In effecting adjustment for books of different thicknesses and widths the rail portion 590 is so positioned with relation to the rail 270 that the cover C will slide into the recess 592 preferably with a small clearance between the outer edge of the cover and the inner end of the recess.

Mounted in suitable bearings in the blocks 582 and 584 is a longitudinal shaft 596 corresponding in function to the shaft 416. Rotatably mounted on the shaft 596 is a sleeve 598 having pinions 600 and 602 preferably formed integrally therewith. Rigidly secured to the shaft 596 adjacent the ends of the sleeve 598 are brackets 604 and 606, these brackets being formed with longitudinal guideways in which a plate 608 is movable, as shown in Fig. 30. The plate 608 is provided with racks 610 and 612 which mesh respectively with the pinions 600 and 602.

The shaft 596 can be rocked or oscillated to move the brackets 604 and 606 and the parts associated therewith between the upper positions shown in Fig. 26 and the lower positions shown in Fig. 27. For effecting such oscillation the shaft 596 carries at its retrograde end a pinion 448 which is or may be the same as the pinion 448 already described. The mechanism for moving the pinion 448 includes a rack 450 and various other parts as already described. For oscillating the sleeve 598 on the shaft 596 there is provided a vertically movable rack 464 already described. The rack 464 is guided in a bracket 614 secured to the block 584 as shown in Figs. 26 and 27. An opening 615 may be provided in the plate 608 to provide clearance for the upper end of the rack 464 when in the position shown in Fig. 27. The mechanism for vertically reciprocating the rack 464 may be the same as has been described.

Secured to the brackets 604 and 606 are relatively thin plates 616 and 618 which extend beyond the ends of the brackets. Connected with the ends of the respective plates 616 and 618 are blocks 620 and a plate 622 is connected with the blocks, as for instance by screws 624, 624. Carried by the plate 622 at the outer side thereof, that is, at the side away from the center of the machine, is a plate 626. The plate 626 is connected with the plate 622 by means of screws 628, these screws extending through the plate 622 and extending through transverse slots 630, 630 in the plate 626 as shown more clearly in Fig. 30. Thus the plate 626 is movable with respect to the plate 622 to the extent permitted by the said slots. The plate 626 carries pins 632 which are engaged by leaf springs 634 secured to the blocks 620. As shown, the plate 622 is provided with slots 636 which provide clearance for the ends of the pins 632. When the parts are in the positions shown in Fig. 26 the springs 632, by reason of their engagement with the pins 632, move the plate 626 to its outermost position with respect to the blocks 620.

Carried by the plate 608 is a jacket folding and creasing member or bar 638 generally corresponding in function to the plate 428. The bar 638 has a creasing groove 640 and preferably has a folding portion 642 below the groove. The creasing groove 640 is inwardly open to receive the corresponding cover edge and has upper and lower walls facing respectively downwardly and upwardly. The bar 638 is connected with a longitudinal bar 644 which is movable along the face of the plate 608. As shown, the bar 644 is carried by pins 646, 646 which are longitudinally movable in bearing apertures formed in bars 648 and 650 rigidly secured to the plate 608 as shown more clearly in Fig. 29. Inasmuch as the bar 644 and the bar 638 are carried by the pins 646, 646, which pins are longitudinally movable, the said bars are movable in parallelism with respect to the plate 608. The pins 646, 646 are provided with collars 652, 652 and coil springs 654, 654 are interposed between the said collars and the said bar 650. Thus the springs tend to move the bars 644 and 638 in the outward direction. For limiting movement in the outward direction there is provided a bolt 656 which extends through apertures in the bars 644 and 648. A head on the bolt engages the bar 644 and nuts 657 on the bolt are positioned to engage the bar 648. Thus the bolt 656 serves to limit the outward movement of the bars 644 and 648, the exact extent of outward movement being adjustable by means of the nuts 657.

The timing of the racks 450 and 464 is such that the shaft 596 and the sleeve 598 are moved in synchronism when the several parts are to be moved from the positions shown in Fig. 26 to the positions shown in Fig. 27, the rack 450 moving upward and the rack 464 moving downward at the same speeds. Therefore, as the parts move from the positions shown in Fig. 26 to the positions shown in Fig. 27 there is no relative movement between the pinions 600 and 602 and the racks 610 and 612.

Movement of the parts to the positions shown in Fig. 27 is limited by interengaging stops 658, 658 and 659, 659 secured respectively to the blocks 582 and 584 and to the plate 608. The stops have horizontal engaging surfaces and the plate 608 is therefore free to move horizontally.

With the parts in or near the positions shown in Fig. 26 a book is in place with its cover C supported on the rail 586. The jacket J has already been folded during the next preceding cycle of operations and the jacket is held in the position shown by a jacket supporting plate which will hereinafter be described in detail. With the parts remaining in or near the positions shown, the book and the folded jacket are moved rearward, that is, toward the observer. The next following book is moved into the same position and a jacket J is placed thereon by the jacket applying mechanism that has been described. The jacket so placed is initially flat and is in the position indicated by dot-and-dash lines at J⁴.

With the jacket J in place as described, the racks 450 and 464 are moved vertically and in opposite directions to bring the parts to the positions shown in Fig. 27. At the same time the plate 660 is lowered to the position shown in Fig. 27. As the plate 626 moves downward, it engages the jacket at the top of the book cover and holds it in place to prevent any possible slipping. The plate initially engages the jacket immediately before the positions shown in Fig. 27 are reached and remains stationary. The plate 622 continues to move and the springs 634, 634 are flexed, thus causing the plate 622 to apply increased pressure against the jacket. Just after the plate 626 engages the jacket J to hold it, the portion 642 of the bar 638 engages the jacket and partly folds it to the position shown at J⁵ in Fig. 27.

With the parts in the positions shown in Fig. 27, the downward movement of the rack 464 is continued, and this continued movement turns the sleeve 598 in the clockwise direction thus moving the plate 608 toward the right. As the plate 608 so moves, it moves the bar 638 toward the right to the position shown in Fig. 28. As the bar 638 so moves the groove 640 therein embraces the edge of the rail portion 590 to complete the folding of the jacket to the position shown at J⁶. The thickness of the jacket is exaggerated in the drawings and the width of the groove 640 as shown is therefore correspondingly exaggerated. When the bar 638 reaches its limit of movement as determined by the rail portion 590, the movement of the plate 608 is continued for a short distance, the springs 654, 654 being compressed. The bar 638 thus applies considerable pressure to the folded jacket, and the jacket is permanently creased adjacent the edge of the corresponding book cover.

As has been stated, the total thickness of the rail portion 590 at the upturned edge thereof is approximately the same as the thickness of the book cover. The groove 640 in the folding and creasing member 638 is of such size and shape that it forms the jacket around the edge of the rail member, the fold or crease in the jacket being thus given a shape which adapts it to later receive and closely fit the edge of the book cover. The described shaping of the fold or crease may be obtained by pressure alone, but preferably the rail 586, comprising the parts 588 and 590, is heated to such a temperature as to assist in permanently setting the fold or crease in the jacket in the shape to which it has been formed as above described. The temperature is so controlled as to avoid any scorching or other damage to the jacket. Heating may be effected in any suitable manner, as for instance by an electrical resistance heater 662 secured to the bottom of the rail member 588.

It will be seen that relationship between the edge of the rail portion 590 and the edge of the corresponding book cover are such that the jacket is folded with a predetermined looseness or slack. The reasons for this have been fully set forth and need not be repeated.

After the parts have reached the positions shown in Fig. 28, the described motions are reversed and the parts are returned to the positions shown in Fig. 26. At the same time the plate 660 is restored to the position shown in Fig. 26, the plate then serving to maintain the jacket in folded position.

The rail 586 must be supported at its advance end during folding of the jacket in order to resist the pressure applied thereto by the holding plate 626 and the folding and creasing bar 638. However, the rail support at the advance end must be released and moved out of position in order that it may not interfere with the cover and jacket as the book is moved out of the jacket applying station to the next following station. A suitable rail supporting latch and the operating mechanism therefor are shown in Figs. 29 to 33.

A latch 664 is provided which is pivotally movable about a transverse axis, being supported on a headed pin 666 projecting inward from the block 582. The latch 664 has a notch 668 which is adapted to receive the advance end of the rail portion 588. When the latch is in the position shown in Fig. 30 it firmly supports the advance end of the rail. Preferably, the latch carries a plate 670 which enters a notch 672 in the rail portion 588 to prevent inward deflection of the rail by reason of inward pressure applied thereto by the bar 638. A coil spring 674 on the pin 666 biases the latch for movement in the counterclockwise direction from the disengaged position shown in Fig. 31 to the engaged position shown in Fig. 30.

Figure 32:
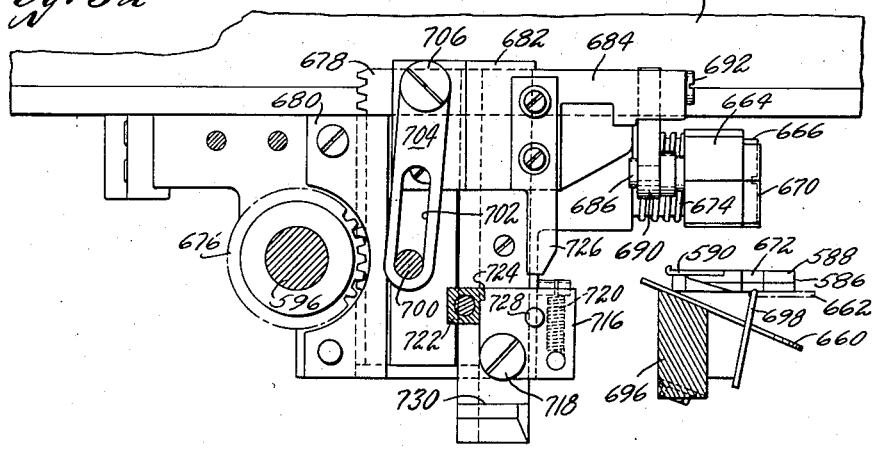
Fig. 32 is a vertical sectional view taken along the line 32—32 of Fig. 29 and showing the jacket and cover supporting plates in their upper position and showing other parts in related positions.
Figure 33:
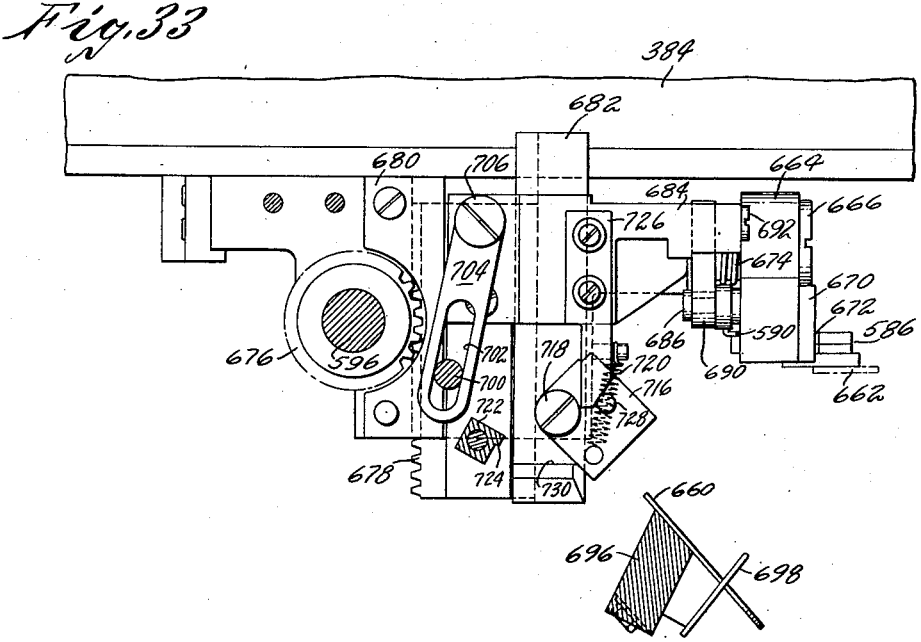
Fig. 33 is a view similar to Fig. 32 but showing the jacket and cover supporting plates in their lower positions.

Secured to the advance end of the shaft 596 is a pinion 676, as shown in Figs. 29, 32 and 33, which meshes with a vertically movable rack 678. The rack is guided by vertical gibs 680 and 682 secured to the block 582. Secured to the rack 678 is a bracket 684. It will be seen that when the rack 450, as shown in Fig. 29, is moved downward to swing the jacket holding and folding parts to their upper positions as shown in Fig. 26, the rack 678 and the bracket 684 are moved upward to the positions shown in Figs. 31 and 32. When the jacket holding and folding parts are swung downward to their lower positions as shown in Fig. 27, the rack 678 and the bracket 684 are moved downward to the positions shown in Figs. 30 and 33.

The latch 664 carries a pin 686 which extends into a slot 688 in a link 690. The upper end of the link 690 is connected with the bracket 684 by a pivot pin 692. With the bracket 684 in its lower position as shown in Figs. 30 and 33, and with the jacket holding and folding parts in their lower positions as shown in Figs. 27 and 28, the latch 664 is in its lower rail engaging position. The latch has been moved to its engaging position by the spring 674, but if the spring should fail to completely engage the latch with the rail complete engagement would be effected by the link 690 acting on the pin 686. With the bracket 684 in its upper position as shown in Figs. 31 and 32, and with the jacket holding and folding parts in their upper positions as shown in Fig. 26, the latch 664 is in its upper rail disengaging position. The latch is moved to its upper disengaging position by the link 690 and the pin 686, these parts acting in opposition to the spring 674.

When the latch is engaged with the rail it supports the advance end thereof to resist pressures applied by the jacket holding plate 626 and by the jacket folding and creasing bar 638. When the latch is disengaged from the rail it is out of the path of the book cover and the jacket as the book and jacket are moved from the jacket applying station to the next following station.

*Alternative jacket supporting and book closing mechanism as shown in Figs. 26 to 35*

When the alternative jacket holding and folding mechanism is provided as shown in Figs. 26 to 30, an alternative book closing mechanism is preferably provided as shown in Figs. 29 to 35. This alternative book closing mechanism is provided in lieu of that shown in Fig. 3.

Figure 34:
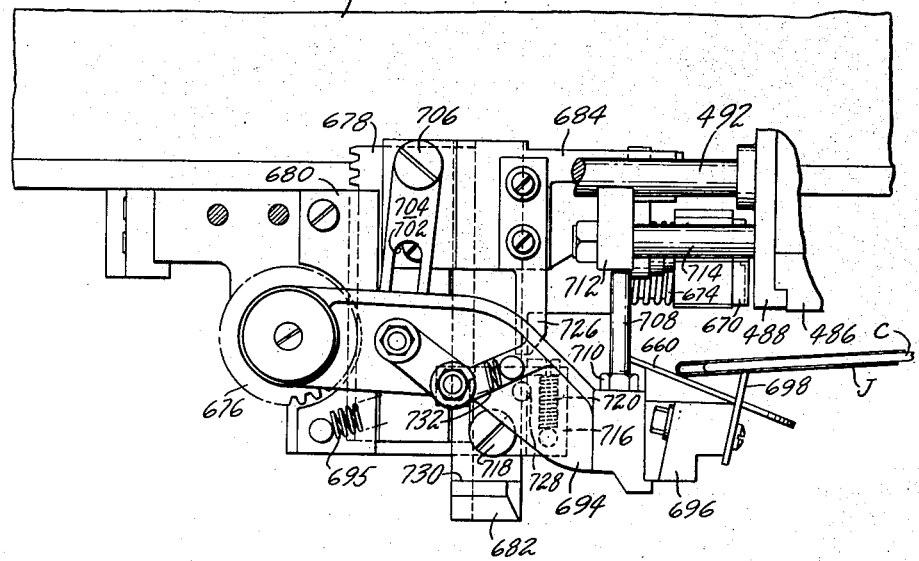
Fig. 34 is a rear view taken in the direction of the arrows 34, 34 in Fig. 29 and showing the jacket and cover supporting plates in their upper positions and showing other parts in related positions.

An arm 694 is loosely mounted on the advance end of the shaft 596. The arm is biased for movement in the clockwise or downward direction by a spring 695. Secured to the end of the arm 694 is a longitudinal bar 696. The bar 696 carries the before-mentioned jacket supporting plate 660 which extends longitudinally throughout the major portion of the jacket applying station. The bar 696 also carries a jacket and cover supporting plate 698 which extends throughout the major portion of the length of the book closing station. The plates 660 and 698 are at substantial angles to each other. When in its upper position the plate 660 is inclined downward and inward toward the center of the machine so as to support the folded jacket as shown in Fig. 26. When in its upper position the plate 698 is inclined upward and inward toward the center of the machine so as to support the book cover and the folded jacket as shown in Fig. 34.

The retrograde end of the plate 698 is beveled as shown in Fig. 31 to facilitate transfer of the book cover and jacket from the jacket applying station to the book closing station. After the jacket has been put in place and folded, the latch 664 is disengaged from the rail and the book and jacket are moved, Fig. 31 showing them in an intermediate position. At the beginning of movement the book cover is supported by the rail 586 and the folded jacket is supported by the plate 660 as shown in Fig. 26, and upon the completion of movement the book cover and the folded jacket are both supported solely by the plate 698 as shown in Fig. 34.

Projecting in the retrograde direction from the arm 694 is a pin which is best shown in Figs. 32 and 33. The pin 700 extends into a slot 702 in a link 704, the upper end of the link being pivoted to the bracket 684 at 706. When the bracket is in its upper position as shown in Figs. 32 and 34, with the jacket holding and folding parts in their upper positions as shown in Fig. 26 and with the latch 664 in its disengaged position, the pin 700 and the arm 694 are held in their upper positions by the link 704. Thus the plates 660 and 698 are held in their upper positions for the transfer of the book from the jacket applying station to the book closing station as shown in Fig. 31.

Preferably, a separate stop is provided for limiting the upward movement of the arm 694 and of the parts carried thereby. If no stop were provided, the inertia of movement might carry the arm 694 and the parts carried thereby upward to such an extent as to cause the jacket supporting plate 660 to engage the folded edge portion of the jacket, as shown in Fig. 26, so as to cause a pinching action between the plate 660 and the rail 586. With the book and jacket in motion from the jacket applying station to the book closing station, as indicated in Fig. 31, the jacket might be damaged by any pinching action such as above mentioned.

As shown, there is a pin 708 having threaded engagement with the arm 694 and held in adjusted position by a nut 710. When the parts reach their upper positions as shown in Fig. 34, the pin 708 engages a stop block 712. The block 712 is carried by a stud 714 which projects from the before-described bracket 488 which guides one of the racks or slides 486, these parts being shown in Figs. 15 and 16. The block 712 rests against the rotatable shaft 492, being thus supported to prevent any possible bending of the stud 714.

A latch 716 is provided for holding the arm 694 and the parts carried thereby in their upper positions. The latch 716 is pivoted to the gib 682 at 718 and is biased for movement in the counterclockwise direction by a spring 720. Projecting in the retrograde direction from the arm 694 is a block 722 which is best shown in Figs. 32 and 33. The block 722 has a lateral projection 724 which fits a notch in the latch 716 when the parts are in the positions shown in Fig. 32. With the parts in the last said positions the arm 694 and the parts carried thereby are held in their upper positions, notwithstanding downward movement of the bracket 684 and the link 704. Thus the plates 660 and 698 are held in their upper positions for a limited time after the jacket holding and folding parts have started to move from the positions shown in Fig. 27 to the positions shown in Fig. 26. This provides time for the book to be moved from the jacket applying station to the book opening station, Fig. 31 showing an intermediate position of such movement.

Figure 35:
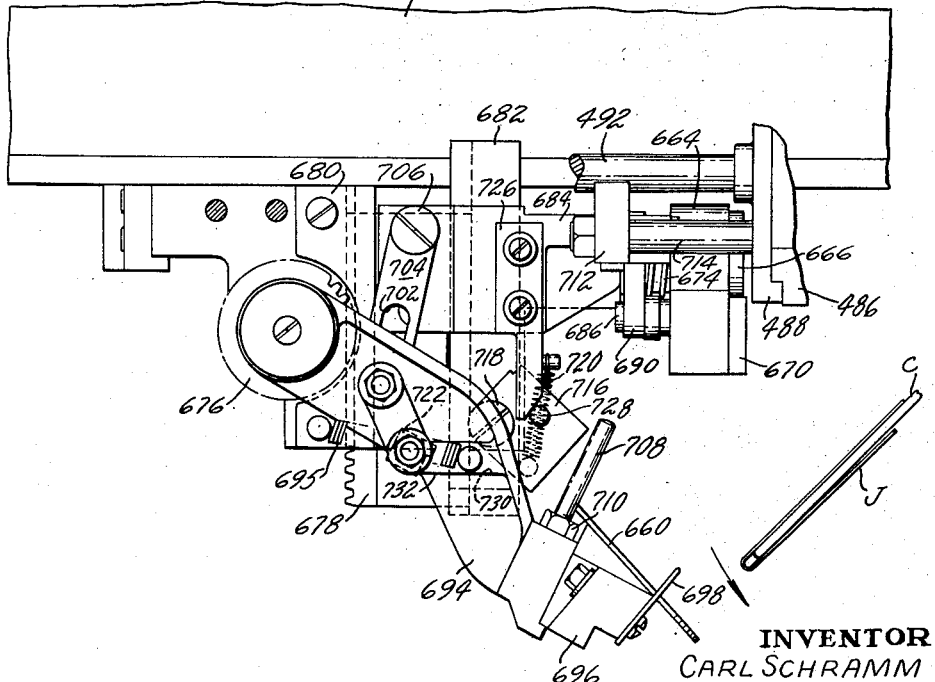
Fig. 35 is a view similar to Fig. 34 but showing the jacket and cover supporting plates in their lower positions.

As the bracket 684 approaches its lower position a latch releasing member 726 thereon engages a pin 728 on the latch 716 to move the latch in the clockwise direction. Such movement of the latch causes it to disengage the block 722, and the arm 694 and the parts carried thereby are moved rapidly downward by the spring 695. Downward movement of the arm is limited by a stop 730 which engages a projecting rib 732 on the arm. The arm 694 is released for downward movement at or about the time that the book with the folded jacket thereon reaches the book closing station. The rapid downward movement of the jacket supporting plate 698 leaves the book cover unsupported and it moves by gravity to closed position as indicated in Fig. 35. Inasmuch as the folded part of the jacket has been held against the inner face of the cover there is no opportunity for the said folded part of the jacket to separate from the cover, particularly as any tendency toward separation is opposed by the air pressure resulting from the downward movement.

When the book cover and the jacket are in the positions shown in Fig. 34 there is a clearance between the edge of the cover and the crease in the jacket, thus providing looseness or slack. This looseness or slack is taken up as the book cover is closed. Fig. 35 shows the cover in an intermediate position with the looseness or slack partly taken up. When the cover is fully closed the crease in the jacket fits the edge of the book cover.

*Summary of operation*

The following summary of the operation of the machine is applicable, except as otherwise stated, not only to the jacket holding and folding mechanism as shown in Figs. 10 to 14 and to the book closing mechanism as shown in Fig. 3, but also to the alternative jacket holding and folding mechanism as shown in Figs. 26 to 30 and to the alternative book closing mechanism as shown in Figs. 29 to 35.

In setting up the machine for books of any given size a rail 68 is selected having a width corresponding approximately to the thickness of the book. The rail need not correspond exactly and some variation is permissible. The rail 68 and the various parts directly associated therewith are adjusted vertically by the mechanism that has been described in order to bring the back of the book to a predetermined fixed elevation. The supporting plates 104, 106 and 112, 114 are adjusted transversely in accordance with the thickness of the books, and this adjustment automatically adjusts the plates 142 and 144 at the book opening station. The cover opening mechanisms are adjusted transversely in accordance with the thickness of the book by means of the shaft 210 and the parts associated therewith. The blocks 246 carrying the vacuum cups are adjusted longitudinally along the shafts 242 in accordance with the length of the books. The rails or supports 270 are adjusted transversely in accordance with the thickness and width of the books so as to be flush or substantially flush with the inner edges of the covers when the said rails are in their innermost positions. The holding and folding mechanisms are adjusted transversely by means of the shaft 392 to bring the rails 408, 408 or 586, 586 into proper relationship with the open covers as shown in Fig. 13 and as already described. The adjustment of the folding mechanisms also adjusts the jacket pushing mechanisms as has already been explained. The jacket supports 276, 276 and 277 are positioned in accordance with the dimension of the jackets, and the slides 304, 304 of the jacket placing mechanism are adjusted transversely so as to be in positions to properly pick up and transfer the jackets.

The operation of the machine is started by means of the hand lever 38 which engages the main clutch. This causes all of the parts of the machine to move through their prescribed cycles and in properly timed relationship with each other as has already been described. The chain 70 with the pushers 78 thereon moves intermittently to carry books successively to the several stations of the machine.

Books to be jacketed are put in place by an operator at the front end of the machine on the rail 68 and between the plates 104, 106. Each book so placed is engaged by the next pusher 78 on the chain and is moved longitudinally thereby into the first station which has been designated as the book loading station, although it is actually an idle station with no operations taking place. Upon the next intermittent movement of the chain the book is moved from the so-called book loading station to the book opening station. At the last said station the covers of the book are engaged by the vacuum cups 248 and 258 and are moved to open positions as shown in Fig. 8, and they are held in such positions by means of the supports or rails 270 which are moved transversely inward under the outer edge portions of the covers.

Upon the next intermittent movement of the chain the book is moved from the book opening station to the jacket applying station, and during this movement the open covers of the book slide along the rails 270, 270 and the rails 408, 408 or 586, 586, being finally supported solely by the said rails 408, 408 or 586, 586. While the covers are so supported a flat jacket is transferred from the stack S and is moved in the retrograde direction and downwardly so as to be placed upon the back and open covers of the book. With the jacket so placed the jacket holding and folding mechanisms, as shown in Figs. 10 to 14, or as shown in Figs. 26 to 30, operate in the manner already described. With the mechanism as shown in Figs. 10 to 14, the portions of the jacket adjacent the edges of the book cover are held by the holding plates 438 of the two mechanisms and the jacket is folded by the folding plates 428 of the two mechanisms to complete the application of the jacket to the book. With the mechanism as shown in Figs. 26 to 30, portions of the jacket adjacent the edges of the book cover are held by the holding plates 626 of the two mechanisms and the jacket is folded and creased by the folding and creasing bars 638 of the two mechanisms to complete the application of the jacket to the book.

As soon as folding is completed the book is moved at the next intermittent action of the chain out of the jacket applying station and at the same time the jacket is engaged by the jacket pusher mechanism shown in Figs. 15 and 16 so as to insure movement of the jacket simultaneously with the book. With the book closing mechanism as shown in Fig. 3, the book covers pass off from the ends of the rails 408, 408 just before the books reach the final or book closing station and they are thereafter closed by gravity. The air jets 576, 576 serve to keep the edge portions of the jackets in engagement with the inner faces of the covers during closing. With the book closing mechanism as shown in Figs. 29 to 35, the book covers and the folded portions of the jackets are supported in the book closing station by the supporting plates 698. When these plates are suddenly moved downward the book covers close by gravity. With either book closing mechanism, the books during the next intermittent movement are moved to the rear end of the machine where they are picked up manually by an operator.

It will be seen that a machine embodying the invention acts completely automatically to open the books, to place jackets thereon, to fold the jackets and to finally close the books. The only duties of the operators are to place books in the machine at the front end thereof and to remove the jacketed books at the rear end thereof. The machine is readily adjustable for all variations in book sizes within wide limits.

The invention claimed is:

1. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, and mechanism automatically operable during each cycle and in synchronized relationship with a corresponding operation of the jacket placing mechanism for engaging the said projecting portions of a previously placed jacket to simultaneously fold the said portions and to simultaneously bring them adjacent the inner faces of the open covers of the corresponding book.

2. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, and mechanism adjacent the said jacket applying station automatically operable during each cycle and in synchronized relationship with a corresponding operation of the jacket placing mechanism for engaging the said projecting portions of a previously placed jacket at the said station to simultaneously fold the said portions and to simultaneously bring them adjacent the inner faces of the open covers of the corresponding book.

3. In a book jacketing machine operable in successive cycles, the combination of means for at least partly supporting a succession of horizontally and longitudinally spaced books having their backs upward, a plurality of longitudinally moving elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station, two devices at opposite sides of the said supporting means and spaced in the retrograde direction from the jacket applying station which devices are automatically operable during each cycle and in synchronized relationship with corresponding movements of the book moving elements for respectively engaging the covers of a book to simultaneously move them to open positions, two longitudinally extending horizontal cover supporting devices at opposite sides of the said supporting means and positioned to engage the inner faces of the covers of each said book after opening by the cover opening devices and to hold the said covers in open positions while the book is moved and while it is at the jacket applying station, mechanism adjacent the jacket applying station automatically operable during each cycle and in synchronized relationship with a corresponding movement of the book moving elements and with corresponding operation of the cover opening devices for placing a jacket on the back and open covers of a book previously moved to the said station which mechanism is constructed and arranged to apply the jacket with the lateral edge portions thereof projecting beyond the lateral edges of the said covers, and mechanism automatically operable during each cycle and in synchronized relationship with a corresponding operation of the jacket placing mechanism for engaging the said projecting portions of a previously placed jacket to simultaneously fold the said portions and to simultaneously bring them adjacent the inner faces of the open covers of the corresponding book.

4. In a book jacketing machine operable in successive cycles, the combination of means for at least partly supporting a succession of horizontally and longitudinally spaced books having their backs upward, a plurality of longitudinally moving elements engageable respectively with the said longitudinally spaced books, mechanism automatically operable during each cycle for causing longitudinal movement of the book engaging elements to longitudinally move the engaged books while maintaining their spaced relationship and to move one of the books to a book opening station and to move another of the books to a jacket applying station, two devices at the book opening station and at opposite sides of the said supporting means which devices are automatically operable during each cycle and in synchronized relationship with corresponding movements of the book moving elements for respectively engaging the covers of a book at the book opening station to simultaneously move the said covers to open positions, two longitudinally extending horizontal cover supporting devices at opposite sides of the said supporting means and positioned to engage the inner faces of the covers of each of the said books after opening by the cover opening devices and to hold the said covers in open positions while the book is moved from the book opening station and while it is at the jacket applying station, mechanism adjacent the jacket applying station automatically operable during each cycle and in synchronized relationship with a corresponding movement of the said book moving elements and with corresponding operation of the cover opening devices for placing a jacket on the back and open covers of a book previously moved to the last said station which jacket applying mechanism is constructed and arranged to apply the jacket with the lateral edge portions thereof projecting beyond the lateral edges of the said covers, and mechanism adjacent the jacket applying station automatically operable during each cycle and in synchronized relationship with a corresponding operation of the jacket placing mechanism for engaging the said projecting portions of a previously placed jacket at the last said station to simultaneously fold the said portions and to simultaneously bring them adjacent the inner faces of the open covers of the corresponding book.

5. In a machine for jacketing books, the combination of mechanism for supporting and horizontally moving a succession of books with their backs upward, supporting devices adjacent the path of movement of the books for supporting the covers of the successive books in open positions, mechanism for applying a jacket to the backs and open covers of the successive books while the covers are held by the supporting devices, mechanism for folding the successive jackets to bring the edge portions thereof adjacent the inner faces of the open covers of the respective books while the covers thereof are held by the said supporting devices, and mechanism for vertically adjusting the book supporting and moving mechanism in parallelism relatively to the supporting devices and the jacket applying mechanism and the jacket folding mechanism, such adjustment being in accordance with the width of the books so that the backs of the successive books are in a predetermined relationship with the supporting devices and the jacket applying mechanism and the jacket folding mechanism regardless of the width of the books.

6. In a machine for jacketing books, the combination of mechanism for supporting and horizontally moving a succession of books with their backs upward, mechanism adjacent a portion of the path of movement of the books for opening the covers of successive books, supporting devices adjacent another portion of the path of movement of the books for holding the covers of the successive books in open positions, mechanism for applying jackets to the backs and open covers of successive books while the said covers are held by the supporting devices, mechanism for folding the successive jackets to bring the edge portions thereof adjacent the inner faces of the open covers of the respective books while the covers thereof are held by the said supporting devices, and mechanism for vertically adjusting the book supporting and moving mechanism in parallelism relatively to the book opening mechanism and the supporting devices and the jacket applying mechanism and the jacket folding mechanism, such adjustment being in accordance with the width of the books so that the backs of the successive books are in a predetermined relationship with the book opening mechanism and the supporting devices and the jacket applying mechanism and the jacket folding mechanism regardless of the width of the books.

7. In a machine for jacketing books, the combination of a rail for supporting a succession of books with their backs upward, longitudinal guides for engaging opposite sides of the successive books to hold them in upright positions, a single mechanism for adjusting the guides transversely in opposite directions and to uniform extents in accordance with the thickness of the books, mechanism for horizontally moving the successive books along the supporting rail and between the guides, supporting devices adjacent the path of movement of the successive books for holding the covers of the said books in open positions, mechanism for applying jackets to the backs and open covers of the successive books while the said covers are held by the supporting devices, and mechanism for folding the successive jackets to bring the edge portions thereof adjacent the inner faces of the open covers of the respective books while the covers thereof are held by the said supporting devices.

8. In a machine for jacketing books, the combination of a rail for supporting a succession of books with their backs upward, longitudinal guides for engaging opposite sides of the successive books to hold them in upright positions, a single mechanism for adjusting the guides transversely in opposite directions and to uniform extents in accordance with the thickness of the books, mechanism for horizontally moving the books along the supporting rail and between the guides, supporting devices adjacent the path of movement of the successive books for holding the covers of the successive books in open positions, mechanism for applying jackets to the backs and opened covers of the successive books while the said covers are held by the supporting devices, mechanism for folding the successive jackets to bring the edge portions thereof adjacent the inner faces of the open covers of the respective books while the covers thereof are held by the said supporting devices, and means for vertically adjusting the book supporting rail and the book guides and the book moving mechanism in parallelism relatively to the supporting devices and the jacket applying mechanism and the jacket folding mechanism, such adjustment being in accordance with the width of the books so that the backs of the successive books are in a predetermined relationship with the supporting devices and the jacket applying mechanism and the jacket folding mechanism regardless of the width of the books.

9. In a machine for jacketing books, the combination of a rail for supporting a succession of books with their backs upward, intermittently acting mechanism for moving the books horizontally along the supporting rail to a book opening station and then to a jacket applying station, a pair of longitudinal guides at the retrograde end of the book opening station for engaging opposite sides of successive books, a second pair of longitudinal guides at the book opening station for engaging opposite sides of the successive books, mechanism at the book opening station for engaging the covers of the successive books to move them to open positions, mechanism operable in timed relation with the book opening mechanism for moving the guides of the second pair out of their book engaging positions while the covers of each book are being moved to open positions and for thereafter returning the said guides to their book engaging positions, supporting devices for holding the covers of the successive books in open positions, and mechanism located at least in part at the jacket applying station for applying a jacket to the backs and open covers of the successive books while the said covers are held by the said supporting devices.

10. In a machine for jacketing books, the combination of a rail for supporting a succession of books with their backs upward, intermittently acting mechanism for moving the books horizontally along the supporting rail to a book opening station and then to a jacket applying station, a pair of longitudinal guides at the retrograde end of the book opening station for engaging opposite sides of the successive books, a second pair of longitudinal guides at the book opening station for engaging opposite sides of the successive books, a third pair of longitudinal guides in advance of the book opening station for engaging opposite sides of the successive books, mechanism at the book opening station for engaging the covers of the successive books to move them to open positions, mechanism operable in timed relation with the book opening mechanism for moving the guides of the second pair out of their book engaging positions while the covers of each book are being moved to open positions and for thereafter returning the said guides to their book engaging positions, supporting devices for holding the covers of successive books in their open positions, and mechanism located at least in part at the jacket applying station for applying a jacket to the backs and open covers of successive books while the said covers are held by the said supporting devices.

11. In a machine for jacketing books, the combination of a rail for supporting a succession of books with their backs upward, intermittently acting mechanism for moving the books horizontally along the supporting rail to a book opening station and then to a jacket applying station, a pair of longitudinal guides at the retrograde end of the book opening station for engaging opposite sides of the successive books, a second pair of longitudinal guides at the book opening station for engaging opposite sides of the successive books, mechanism at the book opening station for engaging the covers of the successive books to move them to open positions, mechanism operable in timed relation with the book opening mechanism for moving the guides of the second pair out of their book engaging positions while the covers of each book are being moved to open positions and for thereafter returning the said guides to their book engaging positions, a single mechanism for simultaneously adjusting the guides of both pairs transversely in opposite directions and to uniform extents so as to change their book engaging positions in accordance with the thickness of the books, supporting devices for holding the covers of the successive books in open positions, and mechanism located at least in part at the jacket applying station for applying a jacket to the backs and open covers of the successive books while the said covers are held by the said supporting devices.

12. In a book jacketing machine, the combination of a rail for supporting a succession of books with their backs upward, intermittently acting mechanism for moving the books horizontally along the supporting rail to a book opening station and then to a jacket applying station, a pair of longitudinal guides at the retrograde end of the book opening station for engaging opposite sides of the successive books, a single mechanism for adjusting the guides transversely in opposite directions and to uniform extents in accordance with the thickness of the books, a second pair of longitudinal guides at the book opening station for engaging opposite sides of the successive books, the last said guides being spring biased for transverse inward movements and engaging the respective guides of the first pair to be transversely adjustable therewith, mechanism at the book opening station for engaging the covers of the successive books to move them to open positions, mechanism operable in timed relation with the book opening mechanism for moving the guides of the second pair transversely out of their adjusted book engaging positions while the book covers of each book are being moved to open positions and for thereafter returning the said guides to their said adjusted positions, supporting devices for holding the covers of the successive books in their open positions, and mechanism located at least in part at the jacket applying station for applying a jacket to the backs and open covers of the successive books while the said covers are held by the said supporting devices.

13. In a machine for jacketing books, the combination of a rail for supporting a succession of books with their backs upward, intermittently acting mechanism for moving the books horizontally along the supporting rail to a book opening station and then to a jacket applying station, a pair of longitudinal guides at the retrograde end of the book opening station for engaging opposite sides of the successive books, a second pair of longitudinal guides at the book opening station for engaging opposite sides of the successive books, the last said guides being spring biased for transverse inward movements, a third pair of guides in advance of the book opening station for engaging opposite sides of the successive books, a single mechanism for simultaneously adjusting the guides of the first and third pairs transversely in opposite directions and to uniform extents in accordance with the thickness of the books, devices enabling the respective spring biased guides of the second pair to be transversely adjusted automatically with the guides of the first and third pairs, mechanism at the book opening station for engaging the covers of the successive books to move them to open positions, mechanism operable in timed relation with the book opening mechanism for moving the guides of the second pair transversely out of their adjusted book engaging positions while the book covers of each book are being moved to open positions and for thereafter returning the said guides to their said adjusted positions, supporting devices for holding the covers of the successive books in open positions, and mechanism located at least in part at the jacket applying station for applying a jacket to the backs and open covers of the successive books while the said covers are held by the said supporting devices.

14. The combination in a machine of the class described, of intermittently acting mechanism for supporting a succession of books with their backs upward and for horizontally moving the books successively to a book opening station, and two simultaneously acting mechanisms at the book opening station respectively comprising elements engageable with the respective covers of successive books and movable laterally in opposite directions and also upwardly for swinging the covers of the said books about their hinge axes to open positions.

15. The combination in a machine of the class described, of intermittently acting mechanism for supporting a succession of books with their backs upward and for horizontally moving the books successively to a book opening station, means at the book opening station including two simultaneously acting mechanisms respectively comprising elements engageable with the respective covers of successive books and movable laterally in opposite directions and also upwardly for swinging the covers about their hinge axes to open positions, and a single mechanism for adjusting the two cover opening mechanisms transversely in opposite directions and to uniform extents in accordance with the thickness of the books.

16. The combination in a machine of the class described as set forth in claim 15, wherein the cover opening means at the book opening station includes two transversely movable slides, two other slides connected with the first said slides and normally movable in unison therewith, the second said slides being transversely adjustable with respect to the first said slides, a single mechanism for adjusting the second said slides relatively to the respective first said slides transversely in opposite directions and to uniform extents in accordance with the thickness of the books, and mechanisms carried by the respective second said slides and operable in part by the transverse movements in unison of the first and second said slides, the said mechanisms comprising elements engageable with the respective covers of successive books and movable laterally in opposite directions and upwardly for swinging the covers about their hinge axes to open positions.

17. The combination in a machine of the class described, of intermittently acting mechanism for supporting a succession of books with their backs upward and for horizontally moving the books successively to a book opening station, means at the book opening station including two mechanisms respectively comprising longitudinally extending supports and elements on the supports engageable with the respective covers of successive books, the said supports and elements being movable laterally in opposite directions and also upwardly for swinging the covers about their hinge axes to open positions, and devices connecting the cover engaging elements with the supports and permitting longitudinal adjustment of the elements with respect to the supports to enable the said elements to engage the covers at different positions along the length thereof.

18. The combination in a machine of the class described, of intermittently acting mechanism for supporting a succession of books with their backs upward and for horizontally moving the books successively to a book opening station, and two similar means at the book opening station for opening the covers of successive books, each said means comprising a vacuum cup engageable with the corresponding book cover when the cover is in closed position, a shaft carrying the vacuum cup and movable about a longitudinal axis, mechanism for turning the shaft about its axis to swing the vacuum cup and the book cover outwardly and upwardly, and mechanism for simultaneously moving the shaft bodily so that its axis moves in an arcuate path substantially concentric with the hinge axis of the corresponding book cover.

19. The combination in a machine of the class described as set forth in claim 18, wherein each cover opening means comprises a vaccuum cup engageable with the corresponding book cover when the cover is in closed position, a shaft carrying the vacuum cup and movable about a longitudinal axis, a transversely movable slide, a slide carried by and vertically movable on the first slide and provided with bearings for the said shaft, mechanism including a vertical rack on the transversely movable slide and cooperating gearing on the vertically movable slide for turning the shaft upon vertical movement of the last said slide, mechanism for moving the last said slide and the shaft upwardly and for thereby moving the shaft about its axis in the direction to move the vacuum cup and the book cover outwardly and upwardly, and mechanism for transversely moving the first said slide in synchronism with the upward movement of the vertically movable slide so as to cause the axis of the shaft to move in an arcuate path substantially concentric with the hinge axis of the book cover.

20. The combination in a machine of the class described, of intermittently acting mechanism for supporting a succession of books with their backs upward and for horizontally moving the books successively to a book opening station, two transversely movable slides at the book opening station, two other slides connected with the first said slides and normally movable in unison therewith, the second said slides being transversely adjustable with respect to the first said slides, a single mechanism for adjusting the second said slides relatively to the first said slides transversely in opposite directions and to uniform extents in accordance with the thickness of the books, vacuum cups engageable with the respective covers of successive books when the covers are in closed positions, shafts carrying the respective vacuum cups and movable about longitudinal axes, other slides carried by and vertically movable on the respective second said transversely movable slides, mechanism including vertical racks on the last said transversely movable slides and cooperating gearing on the said vertically movable slides for turning the shafts upon vertical movements of the last said slides, mechanism for moving the vertically movable slides and the shafts in unison upwardly and for thereby moving the shafts about their axes in the directions to move the vacuum cups and the book covers outwardly and upwardly, and mechanism for transversely moving the first said slides and the second said slides in unison and oppositely in synchronism with the upward movement of the vertically movable slides so as to cause the axes of the respective shafts to move in arcuate paths substantially concentric with the hinge axes of the book covers.

21. The combination in a machine of the class described, of intermittently acting mechanism for supporting a succession of books with their backs upward and for horizontally moving the books successively to a book opening station, mechanism at the book opening station for opening the covers of successive books, two oppositely disposed supports at the book opening station for the open covers of the books, and mechanism operable in timed relationship with the cover opening mechanism for moving the supports to positions beneath the covers immediately following the movement thereof to open positions.

22. The combination in a machine of the class described, of intermittently acting mechanism for supporting a succession of books with their backs upward and for horizontally moving the books successively to a book opening station, means at the book opening station for opening the covers of the successive books, two horizontally and transversely movable slides each adjacent one edges of the book opening station, mechanism for moving the slides uniformly in opposite directions in timed relationship with the mechanism for opening the covers of the books, supports carried by the respective slides and projecting longitudinally across the book opening station, the said supports being moved by the slides to positions beneath the outer edge portions of the covers immediately following the movement of the covers to open positions, and connections between the supports and the slides permitting the supports to be adjusted longitudinally of the slides in accordance with the width and thickness of the books.

23. The combination in a book jacketing machine, of intermittently acting mechanism for supporting a succession of books with their backs upward and for horizontally moving the books successively to a book opening station and then to a jacket applying station, means at the book opening station including two mechanisms respectively comprising elements engageable with the respective covers of successive books and movable laterally in opposite directions and also upwardly for swinging the covers about their hinge axes to open positions, two oppositely disposed supporting rails at the jacket applying station for holding the covers of the successive book in open positions, and mechanism located at the last said station for applying a jacket to the backs and open covers of the successive books while said covers are held by the said supporting rails.

24. The combination in a machine for applying jackets to books, of intermittently acting mechanism for supporting a succession of books with their backs upward and for horizontally moving the books successively to a book opening station and then to a jacket applying station, means at the book opening station for opening the covers of the successive books, two oppositely disposed supports at the book opening station for holding the covers of the successive books in open positions, mechanism operable in timed relationship with the cover opening mechanism for moving the supports to positions beneath the covers of successive books immediately following the movement of the covers of the respective books to open positions, two oppositely disposed rails at the jacket applying station for engaging and holding the covers of the successive books, the said rails being at approximately the same level as the supports so as to maintain the covers in open positions as the books move from the book opening station to the jacket applying station, and mechanism located at the last said station for applying a jacket to the backs and open covers of the successive books while the said covers are held by the said rails.

25. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station with the retrograde edge thereof in a predetermined position regardless of the length of the book, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the retrograde edge thereof in a predetermined position in register with the said retrograde edge of the book and with the lateral edge portions thereof projecting beyond the lateral edges of the said covers, and mechanism automatically operable during each cycle and in synchronized relationship with a corresponding operation of the jacket placing mechanism for engaging a previously placed jacket to fold it and to bring the said projecting edge portions thereof adjacent the inner faces of the open covers of the corresponding book.

26. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, a platform above the path of movement of the books along the supporting means and in advance of the jacket applying station for supporting a stack of jackets, mechanism adjacent the jacket applying station automatically operable during each cycle and in synchronized relationship with a corresponding movement of the book moving elements engaging a single jacket on the stack and for transferring it backwardly and downwardly and for placing it on the back and open covers of a book previously moved to the said station which mechanism is constructed and arranged to apply the jacket with the lateral edge portions thereof projecting beyond the lateral edges of the said covers, and mechanism automatically operable during each cycle and in synchronized relationship with a corresponding operation of the jacket placing mechanism for engaging a previously placed jacket to fold it and to bring the said projecting edge portions thereof adjacent the inner faces of the open covers of the corresponding book.

27. In a machine for applying jackets to books, the combination of intermittently acting mechanism for supporting a succession of books with their backs upward and for horizontally moving the books successively to a jacket applying station, means at the said station for holding the covers of the successive books in open positions, a platform adjacent the jacket applying station for supporting a stack of jackets, a carrier horizontally reciprocable between a position over the stack on the platform and a position over the successive open books at the jacket applying station, a slide supported on the carrier and vertically movable relatively thereto, a device on the slide for engaging a succession of single jackets on the stack, mechanism for horizontally moving the carrier and for vertically moving the slide relatively to the carrier so as to transfer successive jackets engaged by the jacket engaging device from the stack and so as to place them on the backs and open covers of the successive books, and mechanism for folding the successive jackets to bring the edge portions thereof adjacent the inner faces of the open covers of the successive books.

28. In a machine for applying jackets to books, the combination of intermittently acting mechanism for supporting a succession of books with their backs upward and for horizontally moving the books successively to a jacket applying station, means at the said station for holding the covers of the successive books in open positions, a platform adjacent the jacket applying station for supporting a stack of jackets, a carrier horizontally reciprocable between a position over the stack on the platform and a position over the open books at the jacket applying station, a slide supported on the carrier and vertically movable relative thereto, a device on the slide for engaging a succession of single jackets on the stack, a vertical rack on the slide, a transverse shaft on the carrier having a pinion engaging the rack, a second pinion on the shaft, a second rack extending in the direction of carrier movement and meshing with the second pinion, means for horizontally moving the carrier and for vertically moving the slide relatively to the carrier through the action of the said racks and pinions so as to transfer a succession of jackets engaged by the jacket engaging device from the said stack and so as to place them on the backs and open covers of the successive books, and mechanism for folding the successive jackets to bring the edge portions thereof adjacent the inner faces of the open covers of the successive books.

29. In a machine for applying jackets to books, the combination of intermittently acting mechanism for supporting a succession of books with their backs upward, intermittently acting mechanism for horizontally moving the books successively to a jacket applying station, means at the said station for holding the covers of the successive books in open positions, a platform adjacent the jacket applying station for supporting a stack of jackets, a carrier horizontally reciprocable between a position over the stack on the platform and a position over the open books at the jacket applying station, a slide supported on the carrier and vertically movable relatively thereto, a device on the slide for engaging a succession of single jackets on the stack, a vertical rack on the slide, a transverse shaft on the carrier having a pinion engaging the rack, a second pinion on the shaft, a second rack extending in the direction of carrier movement and meshing with the second pinion, means for moving the carrier horizontally, means for separately moving the rack horizontally, the last two said means serving through the action of the said racks and pinions to move the slide vertically relatively to the carrier and the said jacket engaging means serving when the slide is so moved to transfer a succession of jackets from the stack and place them on the backs and open covers of the successive books, and mechanism for folding the successive jackets to bring the edge portions thereof adjacent the inner faces of the open covers of the sucessive books.

30. In a machine for applying jackets to books, the combination of intermittently acting mechanism for supporting a succession of books with their backs upward and for horizontally moving the books successively to a jacket applying station, means at the said station for holding the covers of the successive books in open positions, a platform adjacent the jacket applying station for supporting a stack of jackets, a carrier horizontally reciprocable between a position over the stack on the platform and a position over the open books at the jacket applying station, a slide supported on the carrier and vertically movable relatively thereto and also transversely adjustable relatively thereto, a device on the slide for engaging a succession of single jackets on the stack, a vertical rack on the slide, a transverse shaft on the carrier having a pinion engaging the rack, the said pinion being adjustable along the shaft in accordance with the transverse adjustment of the slide, a second pinion on the shaft, a rack extending in the direction of carrier movement and meshing with the second pinion, means for horizontally moving the carrier and for vertically moving the slide relatively to the carrier through the action of the said racks and pinions so as to transfer a succession of jackets engaged by the jacket engaging device from the said stack so as to place them on the backs and open covers of the successive books, and mechanism for folding the successive jackets to bring the edge portions thereof adjacent the inner faces of the open covers of the successive books.

31. The combination of means for supporting a book with its back upward and with its covers in open positions, the said means including two longitudinal rails below and closely adjacent the edge portions of the covers, two similar longitudinally extending folding members adjacent the longitudinal rails and adapted for folding a jacket placed on the back and open covers of the book with the edge portions thereof projecting beyond the edges of the book covers, and mechanism for moving the folding members downwardly in unison past the edges of the book covers and past the said rails to fold the edge portions of the jacket downwardly and for then moving the folding members inwardly in unison and in opposite directions with portions thereof moving below the rails to fold the edge portions of the jackets inwardly.

32. The combination of means for supporting a book with its back upward and with its covers in open positions which means includes two transversely spaced longitudinal stationary rails having their outer edges near the edges of the book covers and spaced outwardly therefrom, two similar longitudinally extending folding and creasing members adjacent the outer edges of the said rails and adapted for folding and creasing a jacket placed on the back and open covers of the book with the edge portions thereof projecting beyond the edges of the book covers, each said member having a longitudinal creasing and forming groove therein which groove is inwardly open for the reception of the corresponding cover edge and has upper and lower walls facing respectively downwardly and upwardly, and mechanism for moving the folding members downwardly in unison and in close proximity to the edges of the rails so as to fold the edge portions of the jacket downwardly and for then moving the folding members inwardly in unison to cause the creasing and forming grooves therein to embrace the edges of the corresponding rails so as to fold the edge portions of the jackets inwardly and so as to crease the jacket adjacent the edges of the covers and form it in conformity with the shapes of the rails.

33. The combination of means for supporting a book with its back upward and with its covers in open positions which means includes two transversely spaced longitudinal stationary rails having their outer edges near the edges of the book covers and spaced outwardly therefrom, two similar longitudinally extending folding and creasing members adjacent the outer edges of the said rails and adapted for folding and creasing a jacket placed on the back and open covers of the book with the edge portions thereof projecting beyond the edges of the book covers, each said member having a longitudinal creasing and forming groove therein which groove is inwardly open for the reception of the corresponding cover edge and has upper and lower walls facing respectively downwardly and upwardly and each said member having a longitudinal folding portion below the said groove and extending inwardly therefrom, and mechanism for moving the folding members downwardly in unison to cause the folding portions thereof to move past the edges of the book covers and of the rails and to thereby fold the edge portions of the jacket downwardly and for then moving the folding members inwardly in unison to cause the creasing and forming grooves therein to embrace the edges of the corresponding rails so as to fold the edge portions of the jackets inwardly and so as to crease the jacket adjacent the edges of the covers and form it in conformity with the shapes of the rails.

34. The combination of means for supporting a book with its back upward and with its covers in open positions which means includes two transversely spaced longitudinal stationary rails having their outer edges near the edges of the book covers and spaced outwardly therefrom, means associated with each rail for heating it to a temperature sufficient to facilitate creasing and forming a jacket but insufficient to cause jacket damage, two similar longitudinally extending folding and creasing members adjacent the outer edges of the said rails and adapted for folding and creasing a jacket placed on the back and open covers of the book with the edge portions thereof projecting beyond the edges of the book covers, each said member having a longitudinal creasing and forming groove therein which groove is inwardly open for the reception of the corresponding cover edge and has upper and lower walls facing respectively downwardly and upwardly, and mechanism for moving the folding members downwardly in unison in close proximity to the rails so as to fold the edge portions of the jacket downwardly and for then moving the folding members inwardly in unison and in opposite directions to cause the creasing and forming grooves therein to embrace the edges of the corresponding rails so as to fold the edge portions of the jackets inwardly and so as to crease the jacket adjacent the edges of the corresponding covers and to permanently form it in conformity with the shapes of the heated rails.

35. The combination of means for supporting a book with its back upward and with its covers in open positions which means includes two transversely spaced longitudinal stationary rails having their outer edges near the edges of the book covers, and two similar folding means adjacent the outer edges of the said rails and adapted for folding a jacket placed on the back and open covers of the book with the edge portions thereof projecting beyond the edges of the book covers, the two said folding means being operable in unison and each of them comprising a carrier movable about a longitudinal axis, a folding member supported by the carrier and transversely slidable relatively thereto which folding member has a longitudinal creasing groove therein, mechanism for moving the carrier downwardly about its axis and for thereby moving the folding member in close proximity to the edge of the corresponding rail so as to fold the corresponding edge portion of the jacket downwardly, and mechanism for subsequently sliding the folding member transversely and inwardly relatively to the carrier to cause the creasing groove therein to embrace the edge of the corresponding rail so as to fold the corresponding edge portion of the jacket inwardly and so as to crease the jacket adjacent the edge of the corresponding cover.

36. The combination of means for supporting a book with its back upward and with its covers in open positions which means includes two transversely spaced longitudinal stationary rails having their outer edges near the edges of the book covers, and two similar folding means adjacent the outer edges of the said rails and adapted for folding a jacket placed on the back and open covers of the book with the edge portions thereof projecting beyond the edges of the book covers, the two said folding means being operable in unison and each of them comprising a carrier movable about a longitudinal axis, a plate supported by the carrier and transversely slidable relatively thereto, a longitudinally extending folding member carried by the plate and transversely movable relatively thereto which folding member has a longitudinal creasing groove therein, a spring for resisting outward movement of the folding member relatively to the plate, mechanism for moving the carrier downwardly about its axis and for thereby moving the folding member in close proximity to the edge of the corresponding rail so as to fold the corresponding edge portion of the jacket downwardly, and mechanism for subsequently sliding the plate transversely and inwardly relatively to the carrier, the folding member moving with the plate until the creasing groove therein embraces the corresponding rail and the plate then moving additionally in opposition to the spring and the folding member serving by reason of the groove therein to fold the corresponding edge portion of the jacket inwardly and to crease the jacket adjacent the edge of the corresponding cover.

37. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, two folding members respectively adjacent and initially above the positions of the lateral edges of the covers of a book held by the said supporting devices, and mechanism automatically operable during each cycle and in synchronizing relationship with a corresponding operation of the jacket placing mechanism for moving the said folding members downwardly in unison past the lateral edges of the covers of the said book so as to fold the edge portions of the corresponding previously placed jacket downwardly and for then moving the said folding members in unison inwardly and in opposite directions below the said covers so as to fold the edge portions of the said corresponding jacket inwardly adjacent the inner faces of the said covers.

38. In a book jacketing machine, the combination of intermittently acting mechanism for supporting a succession of books with their backs upward and for horizontally moving the books successively to a jacket applying station, means at the said station for holding the covers of a book in open positions, mechanism at the said station for placing a succession of jackets on the backs and open covers of the successive books with the edge portions of each jacket projecting beyond the edges of the respective covers, and two folding means at opposite sides of the machine, each folding means comprising a carrier movable about a longitudinal axis, a folding member supported by the carrier and slidable relatively thereto transversely of the machine, mechanism for moving the carrier downwardly about its axis to move the edge of the folding member downwardly past the edge of the corresponding covers of the successive books to fold the corresponding edge portions of the successive jackets downwardly, and mechanism for subsequently sliding the folding member transversely and inwardly relatively to the carrier so that it folds the said corresponding edge portions of the successive jackets inwardly below the corresponding covers of the successive books.

39. A book jacketing machine as set forth in claim 38, wherein each folding means comprises a longitudinal rockshaft, a carrier mounted for rotative movement with the shaft, a folding member supported on the carrier and movable relatively thereto transversely of the machine, a pinion rotatable on the shaft, a rack on the folding member meshing with the pinion, mechanism for turning the shaft and the carrier to move the edge of the folding member downwardly past the edge of the corresponding covers of the successive books to fold the corresponding edge portions of the successive jackets downwardly, and mechanism for turning the pinion relatively to the shaft to cause the track to slide the folding member transversely and inwardly so that it folds the said corresponding edge portions of the successive jackets inwardly below the corresponding covers of the successive books.

40. In a book jacketing machine, the combination of intermittently acting mechanism for supporting a succession of books with their backs upward and for horizontally moving the books successively to a jacket applying station, two longitudinal rails at the said station positioned beneath the edge portions of the covers of successive books for holding the said covers in open positions, mechanism at the said station for placing a succession of jackets on the backs and open covers of the successive books with the two edge portions of each jacket projecting beyond the edges of the respective covers and beyond the said rails, and two similar oppositely disposed mechanisms for folding the projecting edge portions of the successive jackets downwardly and inwardly around the edges of the covers of the successive books and around the edges of the rails.

41. The combination of means for supporting a book with its back upward and with its covers in open positions, two similar movable carriers respectively adjacent the positions of the edge portions of the open book, two similar holding members movable with the respective carriers and adapted for engaging a jacket placed on the back and open covers of the book with the edge portions thereof projecting beyond the edges of the book covers, the said holding members being movable relatively to the respective carriers, springs tending to move the holding members with the respective carriers but yieldable to permit the said carriers to move independently of the said members upon engagement of the said members with the jacket, two similar folding members on the respective carriers adjacent the positions of the edges of the open book covers, mechanism simultaneously moving the carriers in the directions for moving the holding members downward into engagement with the jacket adjacent the edges of the book covers so as to prevent displacement of the jacket, the carriers upon engagement of the holding members with the jacket moving additionally so as to move the folding members downwardly in unison past the edges of the book covers to thereby fold the edge portions of the jacket downwardly, and mechanism for then moving the folding members simultaneously inwardly relatively to the carriers to fold the edge portions of the jackets inwardly.

42. The combination of means for supporting a book with its back upward and with its covers in open positions, two similar holding and folding means adapted for engaging a jacket placed on the back and open covers of the book with the edge portions thereof projecting beyond the edges of the book covers, each last said means comprising a longitudinal rockshaft, a carrier mounted for rotative movement with the shaft, a longitudinal folding member supported on the carrier and movable transversely relatively thereto, a second carrier rotatively mounted on the shaft, a longitudinal holding plate supported by the second carrier, a spring for biasing the second carrier for relative movement in the direction to engage the holding plate with the jacket adjacent the edge of the corresponding book cover, mechanism for turning the shaft to move the second carrier so as to engage the holding plate with the said jacket and for further turning the shaft in opposition to the spring to move the edge of the folding plate downwardly past the edge of the corresponding book cover so as to fold the corresponding edge portion of the jacket downwardly, and mechanism for thereafter moving the folding plate transversely and inwardly relatively to the first carrier so as to fold the edge portion of the jacket inwardly below the said cover.

43. The combination of means for supporting a book with its back upward and with its covers in open positions, two similar holding and folding means adapted for engaging a jacket placed on the back and open covers of the book with the edge portions thereof projecting beyond the edges of the book covers, each last said means comprising a longitudinal rockshaft, a carrier mounted for rotative movement with the shaft, a longitudinal holding plate supported on the carrier for rotative movement therewith, a longitudinal folding member supported by the carrier and movable transversely relatively thereto, mechanism for turning the shaft to move the carrier so as to engage the holding plate with the said jacket and to move a portion of the folding member downwardly past the edge of the corresponding book cover so as to fold the corresponding edge portion of the jacket downwardly, and mechanism for thereafter moving the folding member transversely and inwardly relatively to the carrier so as to fold the edge portion of the said jacket inwardly below the said cover.

44. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, two holding members respectively adjacent and initially at a higher level than the edge portions of the open covers of a book held by the supporting devices and having a jacket thereon, mechanism automatically operable during each cycle and in synchronized relationship with a corresponding operation of the jacket placing mechanism for moving the two holding members downwardly in unison to engage the corresponding jacket and prevent displacement thereof, and mechanism operable during each cycle and in synchronized relationship with a corresponding operation of the said holding member mechanism for engaging the said projecting portions of a jacket held by the said holding members to simultaneously fold the said portions and to simultaneously bring them adjacent the inner faces of the open covers of the corresponding book, 45. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship and to move one of the books to a jacket applying station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, two holding members respectively adjacent and initially at a higher level than the edge portions of the open covers of a book held by the supporting devices and having a jacket thereon, mechanism automatically operable during each cycle and in synchronized relationship with a corresponding operation of the jacket placing mechanism for moving the two holding members downwardly in unison to engage the corresponding jacket and prevent displacement thereof, two folding members respectively adjacent and initially above the positions of the lateral edges of the covers of a book held by the said supporting devices and having a jacket thereon held by the said holding members, and mechanism automatically operable during each cycle and in synchronized relationship with a corresponding operation of the holding member mechanism for moving the said folding members downwardly in unison past the lateral edges of the covers of the said book so as to fold the edge portions of the corresponding jacket downwardly and for then moving the said folding members in unison inwardly and in opposite directions below the said covers so as to fold the edge portions of the said corresponding jacket inwardly adjacent the inner faces of the said covers.

46. The combination of means for supporting a book with its covers in open positions so that a jacket may be placed thereon with its edge portions projecting beyond the edges of the covers, two folding members engageable with the projecting edge portions of a jacket placed on the book as aforesaid, mechanism operable to move the two folding members in unison for folding the jacket to bring the said edge portions thereof adjacent the lower inner faces of the covers, and means constructed and positioned to engage the jacket during operation of the last said mechanism to provide a slack in the jacket after folding sufficient to permit the covers to be readily closed with the folded jacket in place.

47. The combination of means for supporting a book with its covers in open positions so that a jacket may be placed thereon with its edge portions projecting beyond the edges of the covers, folding guides adjacent the edges of the covers and spaced outwardly therefrom, and mechanism for folding the jacket downwardly and inwardly around the folding guides and for forming the jacket in conformity with the shapes of the guides, the said guides providing a slack in the jacket sufficient to permit the covers to be readily closed with the folded jacket in place.

48. A supporting device for an open book including in combination two longitudinal cover holding rails having longitudinal cover receiving recesses in their upper inner portions and having their outer edges spaced outwardly from the edges of the covers so that when a jacket is folded downwardly and inwardly around the edges of the rails the folded jacket will have sufficient slack therein to permit the covers to be readily closed with the jacket in place.

49. In a machine for jacketing books, the combination of two longitudinal folding guides spaced apart by a distance slightly greater than the distance between the edges of the book covers when in open positions, mechanism for placing a succession of jackets in place above the guides with the edge portions of each jacket projecting beyond the guides, mechanism for folding and forming the edge portions of the successive jackets around the said guides, mechanism for moving a succession of books ot a book closing station with their covers in open positions, mechanism for moving the successive folded jackets to the said book closing station with the central portion of each jacket above the back and open covers of the corresponding book and with the folded edge portions of each jacket below the said open covers of the corresponding book, and means for causing the closing of the covers of the successive books with the successive jackets thereon, the cover folds being spaced by reason of the spacing of the said guides so as to provide sufficient slack to enable the jacket to fit the edges of the book covers when the covers reach their closed positions.

50. In a machine for jacketing books, the combination of means for supporting and horizontally moving a succession of books with their backs upward, means adjacent the path of movement of the books for supporting the covers of the successive books in open positions, mechanism for putting a succession of jackets in place above the backs and open covers of the successive books with the edge portions of each jacket projecting beyond the edges of the covers, mechanism for folding the successive jackets to bring the edge portions thereof adjacent the inner faces of the open covers of the successive books, and means engaging each jacket during folding to provide a slack therein when the folds are engaged with the edges of the covers, the said slack permitting the book covers to be readily closed without unduly tensioning the jacket.

51. In a machine for jacketing books, the combination of means for supporting and horizontally moving a succession of books with their backs upward, means adjacent the path of movement of the books for supporting the covers of the successive books in open positions, mechanism for putting a succession of jackets in place above the backs and open covers of the successive books with the edge portions of each jacket projecting beyond the edges of the covers, mechanism for engaging the successive jackets adjacent the edges of the book covers to prevent displacement of the said jackets, mechanism for folding the successive jackets to bring the edge portions thereof adjacent the inner faces of the open covers of the successive books, and means engaging each jacket during folding to provide a slack therein when the folds are engaged with the edges of the covers, the said slack permitting the book covers to be readily closed without unduly tensioning the jacket.

52. In a machine for jacketing books, the combination of intermittently acting mechanism for supporting a succession of books with their backs upward and for horizontally moving the books successively to a jacket applying station, means at the said station for holding the covers of the successive books in open positions, folding guides adjacent the edges of the book covers and spaced outwardly therefrom, mechanism at the said station for placing a succession of jackets on the backs and open covers of the successive books with the edge portions of each jacket projecting beyond the edges of the covers and beyond the folding guides, and mechanism for folding the edge portions of the successive jackets downwardly and inwardly around the folding guides.

53. In a machine for jacketing books, the combination of intermittently acting mechanism for supporting a succession of books with their backs upward and for horizontally moving the books successively to a jacket applying station, longitudinal rails at the said station for holding the covers of a book in open positions, the said rails having their outer edges spaced outwardly from the edges of the covers to constitute folding guides, mechanism at the said station for placing a succession of jackets on the backs and open covers of the successive books with the edge portions of each jacket projecting beyond the edge portions of the covers and beyond the rails, and mechanism for folding the edge portions of the successive jackets downwardly and inwardly around the edge portions of the rails and for forming the jackets in conformity with the shapes of the rails.

54. In a machine for jacketing books, the combination of intermittently acting mechanism for supporting a succession of books with their backs upward and for horizontally moving the books successively to a jacket applying station, longitudinal rails at the said station for holding the covers of the successive books in open positions, the said rails having their outer edges spaced outwardly from the edges of the covers to constitute folding guides and the said rails having longitudinal cover receiving recesses therein, mechanism at the said station for placing a succession of jackets on the backs and open covers of the successive books with the edge portions of each jacket projecting beyond the edge portions of the covers and beyond the rails, and mechanism for folding the edge portions of the successive jackets downwardly and inwardly around the edge portions of the rails.

55. In a machine for jacketing books, the combination of intermittently acting mechanism for supporting a succession of books with their backs upward and for horizontally moving the books successively to a jacket applying station, longitudinal rails at the said station for holding the covers of a book in open positions, the said rails having their outer edges spaced outwardly from the edges of the covers to constitute folding guides, mechanism at the said station for placing a succession of jackets on the backs and open covers of the successive books with the edge portions of each jacket projecting beyond the edge portions of the covers and beyond the rails, two jacket holding members, mechanism for moving the holding members into engagement with the successive jackets to prevent displacement of the said jackets, and mechanism operable while the successive jackets are held by the holding members for folding the edge portions of the said jackets downwardly and inwardly around the edge portions of the rails.

56. In a machine for jacketing books, the combination of intermittently acting mechanism for supporting a succession of books with their backs upward and for horizontally moving the books successively to a jacket applying station, longitudinal rails at the said station for holding the covers of a book in open positions, the said rails having their outer edges spaced outwardly from the edges of the covers to constitute folding guides, mechanism at the said station for placing a succession of jackets on the backs and open covers of the successive books with the edge portions of each jacket projecting beyond the edge portions of the covers and beyond the rails, two jacket holding members, mechanism for moving the holding members into engagement with the successive jackets to prevent displacement of the said jackets, two jacket folding members, and mechanism operable while each jacket is held by the holding members for moving portions of the folding members downwardly past the edges of the rails to fold the edge portions of the jacket downwardly and for then moving the folding members inwardly to fold the edge portions of the jacket inwardly.

57. In a machine for jacketing books, the combination of mechanism for supporting and horizontally moving a succession of books with their backs upward, longitudinal rails adjacent the path of movement of the book for supporting the covers of the successive books in open positions, mechanism for placing a succession of jackets on the backs and open covers of the successive books with the edge portions of each jacket projecting beyond the edges of the corresponding covers, mechanism for folding the successive jackets downwardly and inwardly to bring the edge portions thereof below the rails and adjacent the inner faces of the open covers of the successive books, releasable supports for the advance ends of the rails, and mechanism operable in timed relation with the movements of the successive books for moving the said supports out of rail engaging positions to permit the successive covers and folded jackets to pass from the said advance ends of the rails.

58. In a machine for jacketing books, the combination of intermittently acting mechanism for supporting a succession of books with their backs upward and for horizontally moving the books successively to a jacket applying station and then from the said station, longitudinal rails at the jacket applying station for supporting the covers of the successive books in open positions, mechanism at the jacket applying station for placing a succession of jackets on the backs and open covers of the successive books with the edge portions of each jacket projecting beyond the edges of the corresponding covers, mechanism at the jacket applying station for folding the successive jackets to bring the edge portions thereof below the rail and adjacent the inner faces of the open covers of the successive books, latches engaging the advance ends of the rails and pivoted for movement about horizontal transverse axes above the rails, and mechanism operable in timed relation with the intermittent movements of the books for moving the said latches forwardly and upwardly out of engagement with the rails to permit the successive covers and folded jackets to pass from the said advance ends of the rails.

59. In a machine for jacketing books, the combination of intermittently acting mechanism for supporting a succession of books with their backs upward and for horizontally moving the books successively to a jacket applying station and then from the said station, longitudinal rails at the jacket applying station for supporting the covers of the successive books in open positions, the said rails having their outer edges spaced outwardly from the edges of the covers to constitute folding guides, mechanism at the jacket applying station for placing a succession of jackets on the backs and open covers of the successive books with the edge portions of each jacket projecting beyond the edges of the corresponding covers and beyond the rails, mechanism at the jacket applying station for folding the edge portions of the jacket downwardly and inwardly around the edge portions of the rails, releasable supports for the advance ends of the rails, and mechanism operable in timed relation with the intermittent movements of the books for moving the said supports out of rail engaging positions to permit the successive covers and folded jackets to pass from the said advance ends of the rails.

60. In a machine for jacketing books, the combination of means for supporting a succession of books with their backs upward, intermittently acting mechanism for horizontally moving the books successively to a jacket applying station and then from the said station, longitudinal rails at the jacket applying station for supporting the covers of the successive books in open positions, the said rails having their outer edges spaced outwardly from the edges of the covers to constitute folding guides, mechanism at the jacket applying station for placing a succession of jackets on the backs and open covers of the successive books with the edge portions of each jacket projecting beyond the edges of the corresponding covers and beyond the rails, two jacket holding members, mechanism for moving the holding members into engagement with the successive jackets immediately above the outwardly spaced portions of the rails to prevent displacement of the said jackets, mechanism operable while the successive jackets are held by the holding members for folding the edge portions of the said jackets downwardly and inwardly around the edge portions of the rails, releasable supports for the advance ends of the rails, and mechanism operable in timed relation with the intermittent movements of the books for moving the said supports out of rail engaging positions to permit the successive covers and folded jackets to pass from the said advance ends of the rails.

61. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship which mechanism serves during each cycle to move one of the books to a jacket applying station and to move a preceding book from the said station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, mechanism at the jacket applying station automatically operable during each cycle and in synchronized relationship with a corresponding operation of the jacket placing mechanism for engaging a previously placed jacket at the said station to fold it and to bring the said projecting edge portions thereof adjacent the inner faces of the open covers of the corresponding book, and mechanism adjacent the jacket applying station and additional to the said book moving elements for engaging the retrograde edge of the jacket after placing and folding thereof which mechanism is automatically operable during each cycle for moving the jacket in unison with the corresponding book when the book is moved from the jacket applying station.

62. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship which mechanism serves during each cycle to move one of the books to a jacket applying station and to move a preceding book from the said station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, mechanism at the jacket applying station automatically operable during each cycle and in synchronized relationship with a corresponding operation of the jacket placing mechanism for engaging a previously placed jacket at the said station to fold it and to bring the said projecting edge portions thereof adjacent the inner faces of the open covers of the corresponding book, a longitudinally reciprocable jacket engaging device adjacent the jacket applying station and additional to the book moving elements which device is engageable with the retrograde edge of the jacket after placing and folding thereof, and mechanism automatically operable during each cycle for reciprocating the jacket engaging device to cause it to move the jacket in unison with the corresponding book when the book is moved from the jacket applying station.

63. The combination of a book jacketing machine, of means for supporting a succession of books with their backs upward, intermittently acting mechanism for horizontally moving the books successively to a jacket applying station and then from the said station, means at the said station for holding the covers of the successive books in open positions, mechanism at the said station for applying a succession of jackets on the backs and open covers of the successive books, and a longitudinally reciprocating member above the position of the books at the jacket applying station, and a latch on the said member which rides over the successive applied jackets and the books during movements in the retrograde direction and which engages the successive jackets during movements in the forward direction to move the said jackets in unison with the corresponding books when the books are moved from the said station.

64. The combination in a book jacketing machine, of means for supporting a succession of books with their backs upward, intermittently acting mechanism for horizontally moving the books successively to a jacket applying station and then from the said station, means at the said station for holding the covers of the successive books in open positions, mechanism at the said station for placing a succession of jackets on the backs and open covers of the successive books with the edge portions of each jacket projecting beyond the edges of the covers, two mechanisms at the jacket applying station for folding the respective edge portions of the successive jackets to bring them adjacent the inner faces of the corresponding book covers, two devices at the jacket applying station for engaging the successive applied jackets and moving them in unison with the corresponding books when the said books are moved from the said station, and a single mechanism for adjusting the two folding mechanisms and the two jacket moving devices transversely in opposite directions and to uniform extents in accordance with the thickness and width of the books.

65. The combination in a book jacketing machine, of mechanism for supporting and horizontally moving a succession of books with their backs upward, mechanism adjacent a portion of the path of movement of the successive books for opening the covers of the said books, means adjacent another portion of the path of movement of the successive books for supporting the covers of the said books in their open positions, mechanism for placing a succession of jackets on the backs and open covers of the successive books while such covers are held by the supporting means, mechanism for folding the successive jackets to bring the edge portions thereof adjacent the inner faces of the open covers of the corresponding books, and mechanism automatically operable upon the failure of the book opening mechanism to open a book for preventing the placement of a jacket by the jacket placing mechanism.

66. The combination in a book jacketing machine, of means for supporting a succession of books with their backs upward, intermittently acting mechanism for horizontally moving the books successively to a book opening station and then to a jacket applying station, two mechanisms at the book opening station respectively comprising vacuum cups engageable with the respective covers of the successive books and movable laterally in opposite directions and also upwardly for swinging the said covers about their hinge axes to open positions, means at the jacket applying station for holding the covers of the successive books in their open positions, mechanism including vacuum cups at the last said station for placing a succession of jackets on the backs and open covers of the successive books, mechanism for folding the successive jackets to bring the edge portions of each jacket adjacent the inner faces of the open covers of the corresponding book, means including a valve mechanism for applying vacuum in proper timed relationship to the vacuum cups of the book opening mechanism and to the vacuum cups of the jacket placing mechanism, and means associated with the valve mechanism for preventing the applying of a vacuum to the second said cups when the vacuum at the first said cups is broken by failure of any of them to properly engage the cover of a book.

67. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship which mechanism serves during each cycle to move one of the books to a jacket applying station and to move another of the books from the jacket applying station to a book closing station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, the advance ends of the said devices being at the advance end of the jacket applying station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, mechanism automatically adjacent the jacket applying station operable during each cycle and in synchronized relationship with a corresponding operation of the jacket placing mechanism for engaging the said projecting portions of a previously placed jacket at the said station to simultaneously fold the said portions and to simultaneously bring them adjacent the inner faces of the open covers of the corresponding book, and means at the said book closing station tending to maintain the folded edge portions of each jacket moved to the said station against the inner faces of the book covers as the covers move downward by gravity after moving out of the jacket applying station and disengaging the cover supporting devices.

68. In a book jacketing machine operable in successive cycles, the combination of means for at least partly supporting a succession of horizontally and longitudinally spaced books having their backs upward, a plurality of longitudinally movable elements engageable respectively with the said longitudinally spaced books, mechanism automatically operable during each cycle for causing longitudinal movement of the book engaging elements to longitudinally move the engaged books while maintaining their spaced relationship which mechanism serves during each cycle to move one of the books to a jacket applying station and to move another of the books from the jacket applying station to a book closing station, two longitudinally extending horizontal cover supporting devices at opposite sides of the said supporting means and located partly in the retrograde direction from the jacket applying station which devices are positioned to engage the inner faces of the covers of each said book and to hold the said covers in open positions while the book is moved and while it is at the said station, the advance ends of the said devices being at the advance end of the jacket applying station, mechanism adjacent the jacket applying station automatically operable during each cycle and in synchronized relationship with a corresponding movement of the book moving elements for placing a jacket on the back and open covers of a book previously moved to the said station which mechanism is constructed and arranged to apply the jacket with the lateral edge portions thereof projecting beyond the lateral edges of the said covers, mechanism automatically adjacent the jacket applying station operable during each cycle and in synchronized relationship with a corresponding operation of the jacket placing mechanism for engaging the said projecting portions of a previously placed jacket at the said station to simultaneously fold the said portions and to simultaneously bring them adjacent the inner faces of the open covers of the corresponding book, and means at the said book closing station for simultaneously applying upward force to the folded edge portions of each jacket moved to the said station so as to maintain them against the inner faces of the corresponding book covers as the covers move downward by gravity after moving out of the jacket applying station and disengaging the cover supporting devices.

69. In a book jacketing machine, the combination of means for supporting a succession of books with their backs upward, intermittently acting mechanism for horizontally moving the books successively to a jacket applying station and then from the said station to a book closing station, means at the said jacket applying station for supporting the covers of the successive books in open positions, the said means terminating at the advance edge of the said station, mechanism at the said jacket applying station for placing a succession of jackets on the backs and open covers of the successive books with the edge portions of the jackets projecting beyond the edges of the covers, mechanism at the said jacket applying station for folding the edge portions of the successive jackets to bring them adjacent the inner faces of the open covers of the corresponding books, and means at the said book closing station for directing jets of air upward against the folded edge portions of the successive jackets to maintain them against the inner faces of the corresponding book covers as the covers move downward by gravity after moving out of the jacket applying station and disengaging the cover supporting means.

70. In a book jacketing machine, the combination of means for supporting a succession of books with their backs upward, intermittently acting mechanism for horizontally moving the books successively to a jacket applying station and then from the said station to a book closing station, means at the said jacket applying station for supporting the covers of the successive books in open positions, the said means terminating at the advance edge of the said station, mechanism at the said jacket applying station for placing a succession of jackets on the backs and open covers of the successive books with the edge portions of each jacket projecting beyond the edges of the covers, mechanism at the said jacket applying station for folding the edge portions of the successive jackets to bring them adjacent the inner faces of the open covers of the corresponding books, and inclined elements at the book closing station for engaging the successive book covers and controlling the downward movements thereof after the said covers move out of the jacket applying station and disengage the cover supporting means.

71. In a book jacketing machine, the combination of means for supporting a succession of books with their backs upward, intermittently acting mechanism for horizontally moving the books successively to a jacket applying station and then from the said station to a book closing station, means at the said jacket applying station for supporting the covers of successive books in open positions, the said means terminating at the advance edge of the said station, mechanism at the said jacket applying station for placing a succession of jackets on the backs and open covers of the successive books with the edge portions of the jackets projecting beyond the edges of the covers, mechanism at the said jacket applying station for folding the edge portions of the successive jackets to bring them adjacent the inner faces of the open covers of the successive books, two jacket supports at the jacket applying station movable to and from upper operative positions, and mechanism serving to move the supports to their said upper positions immediately after the folding of the successive jackets so as to engage the folded edge portions of the jackets and retain them in their folded positions, the said mechanism serving to move the supports to lower inoperative positions after the successive books and the folded jackets thereon have moved from the jacket applying station to the book closing station.

72. In a book jacketing machine, the combination of means for supporting a succession of books with their backs upward, intermittently acting mechanism for horizontally moving the books successively to a jacket applying station and then from the said station to a book closing station, means at the said jacket applying station for supporting the covers of successive books in open positions, the said means terminating at the advance edge of the said station, mechanism at the said jacket applying station for placing a succession of jackets on the backs and open covers of the successive books with the edge portions of the jackets projecting beyond the edges of the covers, mechanism at the said jacket applying station for folding the edge portions of the successive jackets to bring them adjacent the inner faces of the open covers of the successive books, two supports at the book closing station movable to and from upper operative positions, and mechanism serving to hold the supports in their said upper positions during movement of the successive books into the book closing station so that the said supports engage the folded edge portions of the successive jackets and thus initially hold the corresponding book covers in open positions, the said mechanism being operative when the successive books have fully entered the said book closing station to move the supports quickly downward so as to permit the book covers to close by gravity.

73. In a book jacketing machine, the combination of means for supporting a succession of books with their backs upward, intermittently acting mechanism for horizontally moving the books successively to a jacket applying station and then from the said station to a book closing station, means at the said jacket applying station for supporting the covers of successive books in open positions, the said means terminating at the advance edge of the said station, mechanism at the said jacket applying station for placing a succession of jackets on the backs and open covers of the successive books with the edge portions of the jackets projecting beyond the edges of the covers, mechanism at the said jacket applying station for folding the edge portions of the successive jackets to bring them adjacent the inner faces of the open covers of the successive books, two pivotally mounted supports at the book closing station movable to and from upper operative positions, spring means for biasing the supports for downward movement, latch means serving to hold the supports in their said upper positions during movement of the successive books into the book closing station so that the said supports engage the folded edge portions of the successive jackets and thus initially hold the corresponding book covers in open positions, and mechanism serving when the successive books have fully entered the said book closing station to release the latch means so as to enable the spring means to move the supports quickly downward and thereby permit the book covers to close by gravity.

74. In a book jacketing machine, the combination of means for supporting a succession of books with their backs upward, intermittently acting mechanism for horizontally moving the books successively to a jacket applying station and then from the said station to a book closing station, means at the said jacket applying station for supporting the covers of successive books in open positions, the said means terminating at the advance edge of the said station, mechanism at the said jacket applying station for placing a succession of jackets on the backs and open covers of the successive books with the edge portions of the jackets projecting beyond the edges of the covers, mechanism at the said jacket applying station for folding the edge portions of the successive jackets to bring them adjacent the inner faces of the open covers of the successive books, two jacket supports at the jacket applying station movable to and from upper operative positions, two supports at the book closing station movable to and from upper operative positions, and mechanism serving to move all of the supports to their said upper positions immediately following the folding of each successive jacket so that the first said supports engage the folded edge portions of the jacket at the jacket applying station and retain them in folded positions and so that the second said supports engage the folded edge portions of the jacket at the book closing station and thus initially hold the corresponding book covers in open positions, the said mechanism being operative when each successive book has fully entered the book closing station to move all of the supports rapidly downward so as to provide space for the folding of the next following jacket at the jacket applying station and so as to permit the covers of the book at the book closing station to close by gravity.

75. In a book jacketing machine, the combination of means for supporting a succession of books with their backs upward, intermittently acting mechanism for horizontally moving the books successively to a jacket applying station and then from the said station to a book closing station, means at the said jacket applying station for supporting the covers of successive books in open positions, the said means terminating at the advance edge of the said station, mechanism at the said jacket applying station for placing a succession of jackets on the backs and open covers of the successive books with the edge portions of the jackets projecting beyond the edges of the covers, mechanism at the said jacket applying station for folding the edge portions of the successive jackets to bring them adjacent the inner faces of the open covers of the successive books, two jacket supports at the jacket applying station movable to and from upper operative positions, two supports at the book closing station movable to and from upper operative positions, two pivoted arms each carrying one of the first said supports and one of the second said supports, spring means for biasing the arms for downward movement, and mechanisms serving to swing both arms upwardly and thus move all of the supports to their said upper positions immediately following the folding of each successive jacket so that the first said supports engage the folded edge portions of the jacket at the jacket applying station and retain them in folded positions and so that the second said supports engage the folded edge portions of the jacket at the book closing station and thus initially hold the corresponding book covers in open positions, the said mechanism serving when each successive book has fully entered the book closing station to release both arms for rapid downward movement and thus move all of the supports rapidly downward so as to provide space for the folding of the next following jacket at the jacket applying station and so as to permit the covers of the book at the book closing station to close by gravity.

76. The combination of means for supporting a book with its back upward and with its covers in open positions, the said means including two longitudinal rails below and closely adjacent the edge portions of the covers, two similar longitudinally extending folding members adjacent the longitudinal rails and adapted for folding a jacket placed on the back and open covers of the book with the edge portions thereof projecting beyond the edges of the book covers, mechanism for moving the folding members downwardly in unison past the edges of the book covers and past the said rails to fold the edge portions of the jacket downwardly and for then moving the folding members inwardly in unison and in opposite directions with portions thereof moving below the rails to fold the edge portions of the jackets inwardly, and means serving during the inward movement of the two folding members for heating the jacket at longitudinal zones adjacent the edges of the book covers so as to reduce any tendency of the jacket to subsequently unfold.

77. The combination of means for supporting a book with its covers in open positions so that a jacket may be placed thereon with its edge portions projecting beyond the edges of the covers, folding guides adjacent the edges of the covers and spaced outwardly therefrom, mechanism for folding the jacket downwardly and inwardly around the folding guides and for forming the jacket in conformity with the shapes of the guides, the said guides providing a slack in the jacket sufficient to permit the covers to be readily closed with the folded jacket in place, and means serving during the operation of the folding mechanism for heating the jacket at longitudinal zones adjacent the outwardly spaced portions of the folding guides so as to reduce any tendency of the jacket to subsequently unfold.

78. The combination of means for supporting a book with its covers in open positions so that a jacket may be placed thereon with its edge portions projecting beyond the edges of the covers, folding guides adjacent the edges of the covers and spaced outwardly therefrom, means associated with each guide for heating it to a temperature sufficient to facilitate creasing and forming a jacket but insufficient to cause jacket damage, and mechanism for folding the jacket downwardly and inwardly around the folding guides and for forming the jacket in conformity with the shapes of the guides, the said guides providing a slack in the jacket sufficient to permit the covers to be readily closed with the folded jacket in place.

79. The combination of means for supporting a book with its back upward and with its covers in open positions which means includes two transversely spaced longitudinal stationary rails having their outer edges near the edges of the book covers and spaced outwardly therefrom, two similar longitudinally extending folding and creasing members adjacent the outer edges of the said rails and adapted for folding and creasing a jacket placed on the back and open covers of the book with the edge portions thereof projecting beyond the edges of the book covers, each said member having a longitudinal creasing and forming groove therein which groove is inwardly open for the reception of the corresponding cover edge and has upper and lower walls facing respectively downwardly and upwardly, mechanism for moving the folding members downwardly in unison and in close proximity to the edges of the rails so as to fold the edge portions of the jacket downwardly and for then moving the folding members inwardly in unison to cause the creasing and forming grooves therein to embrace the edges of the corresponding rails so as to fold the edge portions of the jackets inwardly and so as to crease the jacket adjacent the edges of the covers and form it in conformity with the shapes of the rails, and means serving while the rails are embraced by the grooves in the folding members for heating the jacket at longitudinal zones between the said rails and the said folding members so as to reduce any tendency of the jacket to subsequently unfold.

References Cited in the file of this patent

UNITED STATES PATENTS 1,397,605    Rhoads _____ Nov. 22, 1921